United States Patent
Sidebottom et al.

(10) Patent No.: US 11,496,389 B2
(45) Date of Patent: *Nov. 8, 2022

(54) UTILIZING EGRESS PEER ENGINEERING TO DETERMINE OPTIMIZED TRAFFIC PLANS AND TO IMPLEMENT AN OPTIMIZED TRAFFIC PLAN

(71) Applicant: Juniper Networks, Inc., Sunnyvale, CA (US)

(72) Inventors: Greg Sidebottom, Ottawa (CA); Patricio Giecco, Upland, CA (US); Julian Kazimierz Lucek, Ipswich (GB)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/249,309

(22) Filed: Feb. 26, 2021

(65) Prior Publication Data

US 2021/0203587 A1 Jul. 1, 2021

Related U.S. Application Data

(63) Continuation of application No. 16/362,974, filed on Mar. 25, 2019, now Pat. No. 10,958,561.

(51) Int. Cl.
*H04L 45/12* (2022.01)
*H04L 41/147* (2022.01)
(Continued)

(52) U.S. Cl.
CPC ............ *H04L 45/12* (2013.01); *H04L 41/147* (2013.01); *H04L 47/22* (2013.01); *H04L 67/104* (2013.01)

(58) Field of Classification Search
None
See application file for complete search history.

(56) References Cited

U.S. PATENT DOCUMENTS

| | | | |
|---|---|---|---|
| 7,185,107 B1 * | 2/2007 | Cassar | H04L 29/12933 709/239 |
| 10,721,168 B1 * | 7/2020 | Sidebottom | H04L 47/127 |

(Continued)

FOREIGN PATENT DOCUMENTS

| | | |
|---|---|---|
| CN | 107317751 A | 11/2017 |
| CN | 109039884 A | 12/2018 |

(Continued)

OTHER PUBLICATIONS

Co-pending U.S. Appl. No. 16/362,974, inventor Sidebottom; Greg, filed Mar. 25, 2019.

(Continued)

*Primary Examiner* — Lonnie V Sweet
(74) *Attorney, Agent, or Firm* — Harrity & Harrity, LLP

(57) ABSTRACT

A device determines traffic and costs associated with a network that includes network devices interconnected by links, and determines traffic assignments for the network based on the traffic and the costs associated with the network. The device determines tunnel use for the network based on the traffic assignments, and determines peer link use for the network based on the tunnel use. The device determines costs associated with the traffic assignments, the tunnel use, and the peer link use for the network, and generates traffic plans based on the traffic assignments, the tunnel use, the peer link use, and the costs associated with the traffic assignments, the tunnel use, and the peer link use. The device causes one of the traffic plans to be implemented in the network by the network devices and the links.

20 Claims, 16 Drawing Sheets

(51) Int. Cl.
*H04L 47/22* (2022.01)
*H04L 67/104* (2022.01)

(56) References Cited

U.S. PATENT DOCUMENTS

| | | | | |
|---|---|---|---|---|
| 10,887,234 | B1* | 1/2021 | Singh | H04L 45/14 |
| 10,958,561 | B1* | 3/2021 | Sidebottom | H04L 41/147 |
| 2006/0174154 | A1 | 8/2006 | Gous et al. | |
| 2010/0195516 | A1 | 8/2010 | McReynolds et al. | |
| 2013/0242718 | A1* | 9/2013 | Zhang | H04L 12/4633 |
| | | | | 370/216 |
| 2013/0343229 | A1* | 12/2013 | Gasparakis | H04L 45/48 |
| | | | | 370/256 |
| 2015/0146535 | A1* | 5/2015 | Koo | G06Q 20/322 |
| | | | | 370/235 |
| 2016/0191194 | A1 | 6/2016 | Wood et al. | |
| 2016/0218917 | A1 | 7/2016 | Zhang et al. | |
| 2016/0285752 | A1* | 9/2016 | Joshi | H04L 45/302 |
| 2016/0352631 | A1 | 12/2016 | Medved et al. | |
| 2017/0078922 | A1* | 3/2017 | Raleigh | H04W 28/10 |
| 2019/0036816 | A1 | 1/2019 | Evans et al. | |
| 2019/0044820 | A1 | 2/2019 | Rosh et al. | |
| 2019/0182166 | A1 | 6/2019 | Ghazisaeedi et al. | |
| 2019/0268234 | A1 | 8/2019 | Cheng et al. | |
| 2020/0007399 | A1 | 1/2020 | Barth et al. | |
| 2020/0162336 | A1 | 5/2020 | Gonguet | |

FOREIGN PATENT DOCUMENTS

| | | |
|---|---|---|
| EP | 2933958 A1 | 10/2015 |
| EP | 2961116 A1 | 12/2015 |

OTHER PUBLICATIONS

Extended European Search Report for Application No. EP19218433.1, dated May 8, 2020, 9 pages . . . .

Gredler H., et al., "Egress Peer Engineering Using BGP-LU, draft-gredler-idr-bgplu-epe-11.txt", Inter-domain Routing, Internet Engineering Task Force (IETF), Internet Society (ISOC) 4, Switzerland, No. 11, Oct. 6, 2017, pp. 1-15, XP015122117.

* cited by examiner

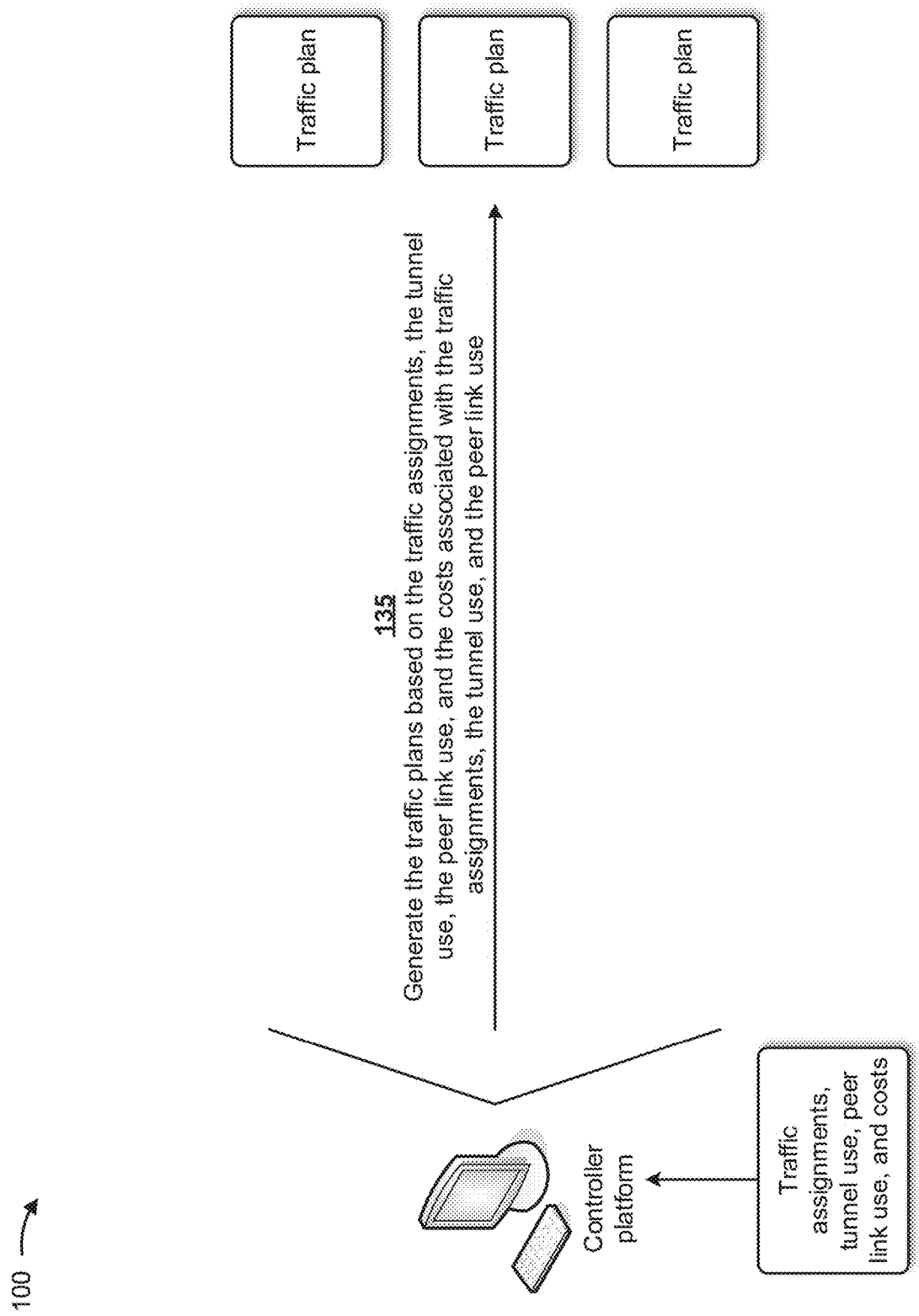

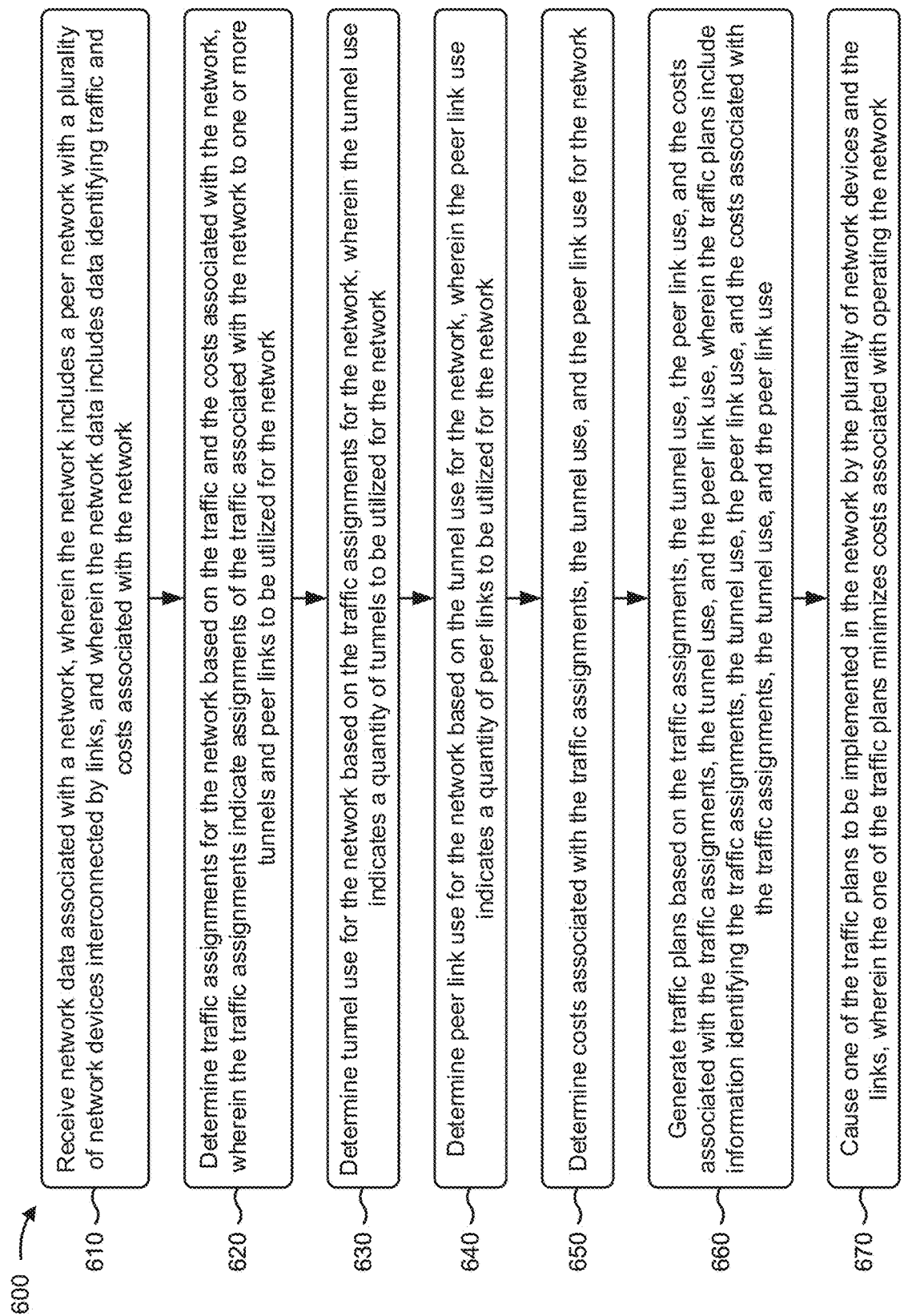

UTILIZING EGRESS PEER ENGINEERING TO DETERMINE OPTIMIZED TRAFFIC PLANS AND TO IMPLEMENT AN OPTIMIZED TRAFFIC PLAN

RELATED APPLICATION

This application is a continuation of U.S. patent application Ser. No. 16/362,974, filed Mar. 25, 2019, which is incorporated herein by reference.

BACKGROUND

Traffic engineering is a method of optimizing a performance of a network by dynamically analyzing, predicting, and regulating behavior of data transmitted over the network. Techniques of traffic engineering can be applied to different types of networks, such as a packet optical network, a public switched telephone network (PSTN), a local area network (LAN), a wide area network (WAN), a cellular telephone network, the Internet, and/or the like.

Egress peer engineering (EPE) is a type of traffic engineering that directs traffic demands exiting a network to a peer operator network in a most cost effective way. Various factors affect the effectiveness and cost of an egress peer engineering traffic plan, such as a cost of transporting traffic demands across the network, a load on egress peer links, a cost of using egress peer links, a cost to the peer operator network to forward traffic to a destination, and/or the like.

SUMMARY

According to some implementations, a method may include receiving network data associated with a network, wherein the network includes a peer network with a plurality of network devices interconnected by links, and determining traffic and costs associated with the network based on the network data. The method may include determining traffic assignments for the network based on the traffic and the costs associated with the network, wherein the traffic assignments indicate assignments of the traffic associated with the network to one or more tunnels and peer links to be utilized for the network. The method may include determining tunnel use for the network based on the traffic assignments for the network, wherein the tunnel use indicates a quantity of tunnels to be utilized for the network, and determining peer link use for the network based on the tunnel use for the network, wherein the peer link use indicates a quantity of peer links to be utilized for the network. The method may include determining costs associated with the traffic assignments, the tunnel use, and the peer link use for the network, and generating traffic plans based on the traffic assignments, the tunnel use, the peer link use, and the costs associated with the traffic assignments, the tunnel use, and the peer link use, wherein the traffic plans include information identifying the traffic assignments, the tunnel use, the peer link use, and the costs associated with the traffic assignments, the tunnel use, and the peer link use. The method may include causing one of the traffic plans to be implemented in the network by the plurality of network devices and the links.

According to some implementations, a device may include one or more memories, and one or more processors, communicatively coupled to the one or more memories, to receive traffic and costs associated with a network, wherein the network includes a peer network with a plurality of network devices interconnected by links, and determine traffic assignments for the network based on the traffic and the costs associated with the network, wherein the traffic assignments indicate assignments of the traffic associated with the network to one or more tunnels and peer links to be utilized for the network. The one or more processors may determine tunnel use for the network based on the traffic assignments for the network, wherein the tunnel use indicates a quantity of tunnels to be utilized for the network, and may determine peer link use for the network based on the tunnel use for the network, wherein the peer link use indicates a quantity of peer links to be utilized for the network. The one or more processors may determine costs associated with the traffic assignments, the tunnel use, and the peer link use for the network, and may generate traffic plans based on the traffic assignments, the tunnel use, the peer link use, and the costs associated with the traffic assignments, the tunnel use, and the peer link use, wherein the traffic plans include information identifying the traffic assignments, the tunnel use, the peer link use, and the costs associated with the traffic assignments, the tunnel use, and the peer link use. The one or more processors may identify a traffic plan, of the traffic plans, that minimizes resource usage associated with operating the network as compared to the other traffic plans, and may cause the traffic plan to be implemented in the network by the plurality of network devices and the links.

According to some implementations, a non-transitory computer-readable medium may store instructions that include one or more instructions that, when executed by one or more processors of a device, may cause the one or more processors to receive network data associated with a network, wherein the network includes a peer network with a plurality of network devices interconnected by links, and wherein the network data includes data identifying traffic and costs associated with the network. The one or more instructions may cause the one or more processors to determine traffic assignments for the network based on the traffic and the costs associated with the network, wherein the traffic assignments indicate assignments of the traffic associated with the network to one or more tunnels and peer links to be utilized for the network. The one or more instructions may cause the one or more processors to determine tunnel use for the network based on the traffic assignments for the network, wherein the tunnel use indicates a quantity of tunnels to be utilized for the network, and determine peer link use for the network based on the tunnel use for the network, wherein the peer link use indicates a quantity of peer links to be utilized for the network. The one or more instructions may cause the one or more processors to determine costs associated with the traffic assignments, the tunnel use, and the peer link use for the network, and generate traffic plans based on the traffic assignments, the tunnel use, the peer link use, and the costs associated with the traffic assignments, the tunnel use, and the peer link use, wherein the traffic plans include information identifying the traffic assignments, the tunnel use, the peer link use, and the costs associated with the traffic assignments, the tunnel use, and the peer link use. The one or more instructions may cause the one or more processors to cause one of the traffic plans to be implemented in the network by the plurality of network devices and the links, wherein the one of the traffic plans minimizes costs associated with operating the network.

BRIEF DESCRIPTION OF THE DRAWINGS

FIGS. 1A-1K are diagrams of one or more example implementations described herein.

FIGS. 4-6 are flow charts of example processes for utilizing egress peer engineering to determine optimized traffic plans and to implement an optimized traffic plan.

DETAILED DESCRIPTION

Figure 1A:
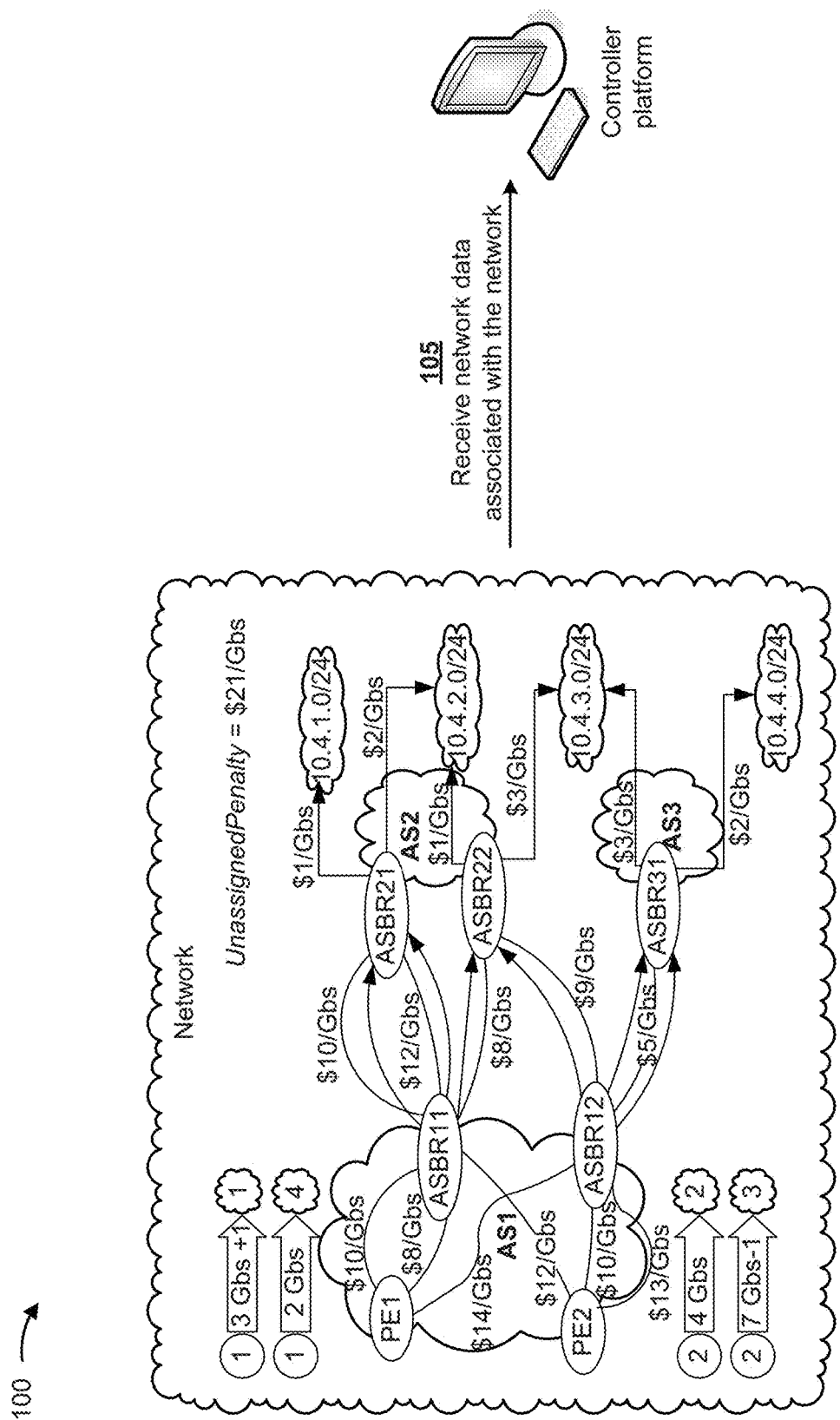

The following detailed description of example implementations refers to the accompanying drawings. The same reference numbers in different drawings may identify the same or similar elements.

A network planning and design system may design a network that includes network devices (e.g., routers, switches, gateways, firewalls, etc.) and links provided between the network devices. However, the network planning and design system may not use traffic engineering to determine a design (e.g., a traffic plan) for a network. If traffic engineering is not used to determine a traffic plan or is incorrectly used to determine a traffic plan, the network planning and design system may not generate an optimized traffic plan, which results in inefficient network operation, inefficient utilization of network resources, and waste of computing resources (e.g., processing resources, memory resources, and/or the like), networking resources, and/or the like.

Some implementations described herein provide a controller platform that utilizes egress peer engineering to determine optimized traffic plans and to implement an optimized traffic plan. For example, the controller platform may receive network data associated with a network that includes a peer network with network devices interconnected by links, and may determine traffic and costs associated with the network based on the network data. The controller platform may determine traffic assignments for the network based on the traffic and the costs associated with the network, where the traffic assignments may indicate assignments of the traffic associated with the network to one or more tunnels and peer links to be utilized for the network. The controller platform may determine tunnel use for the network based on the traffic assignments for the network, where the tunnel use may indicate a quantity of tunnels to be utilized for the network, and may determining peer link use for the network based on the tunnel use for the network, where the peer link use may indicate a quantity of peer links to be utilized for the network. The controller platform may determine costs associated with the traffic assignments, the tunnel use, and the peer link use for the network, and may generate traffic plans based on the traffic assignments, the tunnel use, the peer link use, and the costs associated with the traffic assignments, the tunnel use, and the peer link use. The controller platform may cause one of the traffic plans to be implemented in the network by the network devices and the links.

In this way, the controller platform may utilize egress peer engineering to determine and implement an optimized traffic plan for a network. This, in turn, conserves computing resources (e.g., processing resources, memory resources, and/or the like), networking resources, and/or the like that would otherwise be wasted in identifying a sub-optimal traffic plan, correcting inefficient network operation caused by the sub-optimal traffic plan, correcting inefficient utilization of network resources caused by the sub-optimal traffic plan, and/or the like.

FIGS. 1A-1K are diagrams of one or more example implementations 100 described herein. As shown in FIG. 1A, a network may be associated with a controller platform. In some implementations, the network may include a packet optical network with multiple network devices and multiple links provided between the multiple network devices. In some implementations, the network may include a provider edge (PE) network that includes provider edge (PE) network devices, egress autonomous system border routers (ASBRs), ASBR peer links connected to peer ASBRs, and/or the like. For example, as shown in FIG. 1A, the network may include a first autonomous system network (AS1) that is controlled by the controller platform (e.g., and subject to egress peer engineering), a second autonomous system network (AS2), and a third autonomous system network (AS3). AS1 may include peer links with AS2 and AS3, and may include, for example, two PE network devices (e.g., PE1 and PE2) and two ASBRs (e.g., ASBR11 and ASBR12). AS2 may include two ASBRs (e.g., ASBR21 and ASBR22) and AS3 may include one ASBR (e.g., ASBR31). ASBR11 may include three peer links with AS2 (e.g., two peer links with ASBR21 and one peer link with ASBR22). ASBR12 may include one peer link with ASBR22 in AS2 and one peer link with ASBR31 in AS3. The peer links may include a particular data transfer rate (e.g., ten (10) gigabits per second (Gb/s)). The network may include single rate peering rate plans that vary (e.g., from $5 per Gb/s to $12 per Gb/s). Linear functions for internal and external rates and unassigned traffic, piecewise linear functions for peering rates, and/or the like are examples of cost functions that may be implemented. In some implementations, other cost functions may be utilized for more sophisticated cost models.

The network may include four prefixes (e.g., "10.4.1.0/24," "10.4.2.0/24," "10.4.3.0/24," and "10.4.4.0/24") that are in a top traffic list for the PE network devices. External transit rates (e.g., $1 per Gb/s, $2 per Gb/s, $1 per Gb/s, $3 per Gb/s, $3 per Gb/s, and $2 per Gb/s) between peer ASBRs and the prefixes may be indicated by arrows between a first prefix (e.g., 10.4.1.0/24) and ASBR21, between ASBR21 and a second prefix (e.g., 10.4.2.0/24), between the second prefix and ASBR22, between ASBR22 and a third prefix (e.g., 10.4.3.0/24), between the third prefix and ASBR31, and between ASBR31 and a fourth prefix (e.g., 10.4.4.0/24).

The network may include four tunnels to AS2 and two tunnels to AS3, as indicated by lighter arrows and darker arrows, respectively. The traffic in the network for PE1 may include three (3) Gb/s of traffic to be provided to the first prefix (e.g., 10.4.1.0/24) and two (2) Gb/s of traffic to be provided to the fourth prefix (e.g., 10.4.4.0/24). The traffic in the network for PE2 may include four (4) Gb/s of traffic to be provided to the second prefix (e.g., 10.4.2.0/24) and seven (7) Gb/s of traffic to be provided to the third prefix (e.g., 10.4.3.0/24). Traffic provided between PE1 and the first prefix may be value biased up by one (e.g., +1, indicating traffic that requires a higher quality of service), and traffic provided between PE2 and the third prefix may be value biased down by one (e.g., −1, indicating traffic that requires a lower quality of service). An unassigned traffic penalty may be set to a particular value (e.g., $21 per Gb/s) for traffic that a traffic plan does not assign to a tunnel.

As further shown in FIG. 1A, and by reference number 105, the controller platform may receive network data associated with the network. In some implementations, the network data may include topology data associated with the network, path data associated with the network, and/or the like. The topology data may include data identifying the network devices (e.g., data identifying types of the network devices, network identifiers of the network devices, locations of the network devices, hardware and/or software associated with the network devices, other network devices that are adjacent to the network devices, links connected to the network devices, ports associated with the network devices, and/or the like), the links interconnecting the network devices (e.g., data identifying types of the links, protocols used by the links, network devices to which the links are connected, ports associated with the network devices, and/or the like), utilizations of the network devices (e.g., capacities of the network devices, throughputs of the network devices, and/or the like), and/or the like. The path data may include data identifying paths through the network provided by the network devices, sources (e.g., one or more of the network devices, and/or the like) of the paths through the network, destinations (e.g., one or more of the network devices, and/or the like) of the paths through the network, utilizations of the paths through the network (e.g., capacities of the paths, throughputs of the paths, and/or the like), and/or the like.

The controller platform may periodically receive the network data from the network (e.g., at particular time intervals in seconds, minutes, hours, days, and/or the like), may continuously receive the network data from the network, and/or the like. For example, the controller platform may provide, to the network devices, a request for the network data, and the network devices may provide the network data to the controller platform based on the request.

Although FIG. 1A shows specific quantities of sites, nodes, network devices, links, and/or the like, in some implementations, the network may include more (or less) sites, nodes, network devices, links, and/or the like than depicted in FIG. 1A. For example, the network may include hundreds, thousands, and/or the like of network devices and/or links that generate thousands, millions, billions, etc. of data points. In this way, the controller platform may handle thousands, millions, billions, etc., of data points within a time period (e.g., when determining traffic plans), and thus may provide "big data" capability.

Figure 1B:
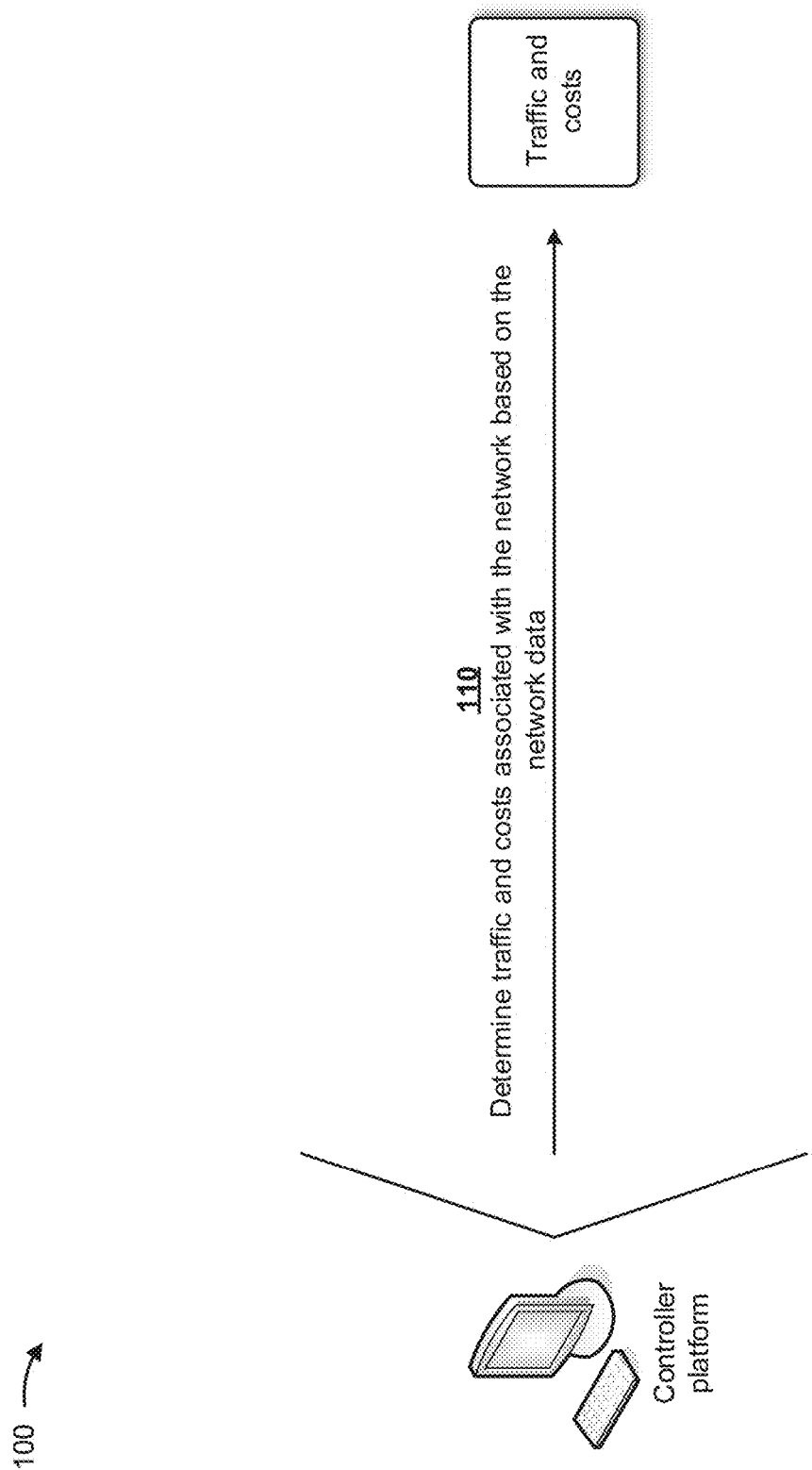

As shown in FIG. 1B, and by reference number 110, the controller platform may determine traffic and costs associated with the network based on the network data. In some implementations, the network data may include information indicating data transfer rates between a PE network device and a prefix (e.g., between PE1 and 10.4.1.0/24). For example, the network data may indicate that traffic in the network for PE1 may include three (3) Gb/s of traffic to be provided to the first prefix (e.g., 10.4.1.0/24) and two (2) Gb/s of traffic to be provided to the fourth prefix (e.g., 10.4.4.0/24). The network data may also indicate that traffic in the network for PE2 may include four (4) Gb/s of traffic to be provided to the second prefix (e.g., 10.4.2.0/24) and seven (7) Gb/s of traffic to be provided to the third prefix (e.g., 10.4.3.0/24).

In some implementations, the costs associated with the network may include internal transit costs associated with the determined traffic, where the internal transit costs may equal tunnel use multiplied by a tunnel cost rate (e.g., based on distance, number of hops, and/or the like); peering costs that are equivalent to peer link usage according to a traffic plan; external transit costs that are equivalent to peer link-prefix use multiplied by an external cost rate (e.g., based on distance, quality of service, and/or the like); costs associated with not engineering traffic (e.g., a quantity of traffic that is not engineered multiplied by a penalty rate); and/or the like. In some implementations, the costs associated with the network may be based on a set of traffic rate ranges with lower and upper bounds (e.g., $b_0=0, b_1, \ldots, b_n=B$ in gigabits per second (Gb/s)) and a cost rate (e.g., $c_1, \ldots, c_n$ in dollars per Gb/s) for traffic in the traffic rate ranges. In such implementations the costs (e.g., for network bandwidth, (1) may be determined as follows:

$$\text{cost}(U) = \sum_{0 < i \leq n} \begin{cases} 0 & \text{if } U = b_0 = 0, \\ c_i(U - b_{i-1}) & \text{if } b_{i-1} < U \leq b_i, \\ c_i(b_i - b_{i-1}) & \text{if } b_i < U \end{cases}$$

For example, if B=10, U=8, and n=3, the traffic range bounds are $b_0=0$, $b_1=5$, $b_2=7$, $b_3=B=10$, and the costs are $(0,5] \rightarrow 2=c_1$, $(5,7] \rightarrow 5=c_2$, and $(7,10]\ 10=c_3$, then the traffic plan may include:

| More than | Not exceeding | Rate | Cost |
|---|---|---|---|
| 0 Gb/s | 5 Gb/s | $2 per Gb/s | $2 × (5 − 0) = $10 |
| 5 Gb/s | 7 Gb/s | $5 per Gb/s | $5 × (7 − 5) = $10 |
| 7 Gb/s | 10 Gb/s | $20 per Gb/s | $20 × (8 − 7) = $20 |
| | | Total | $40 |

Figure 1C:
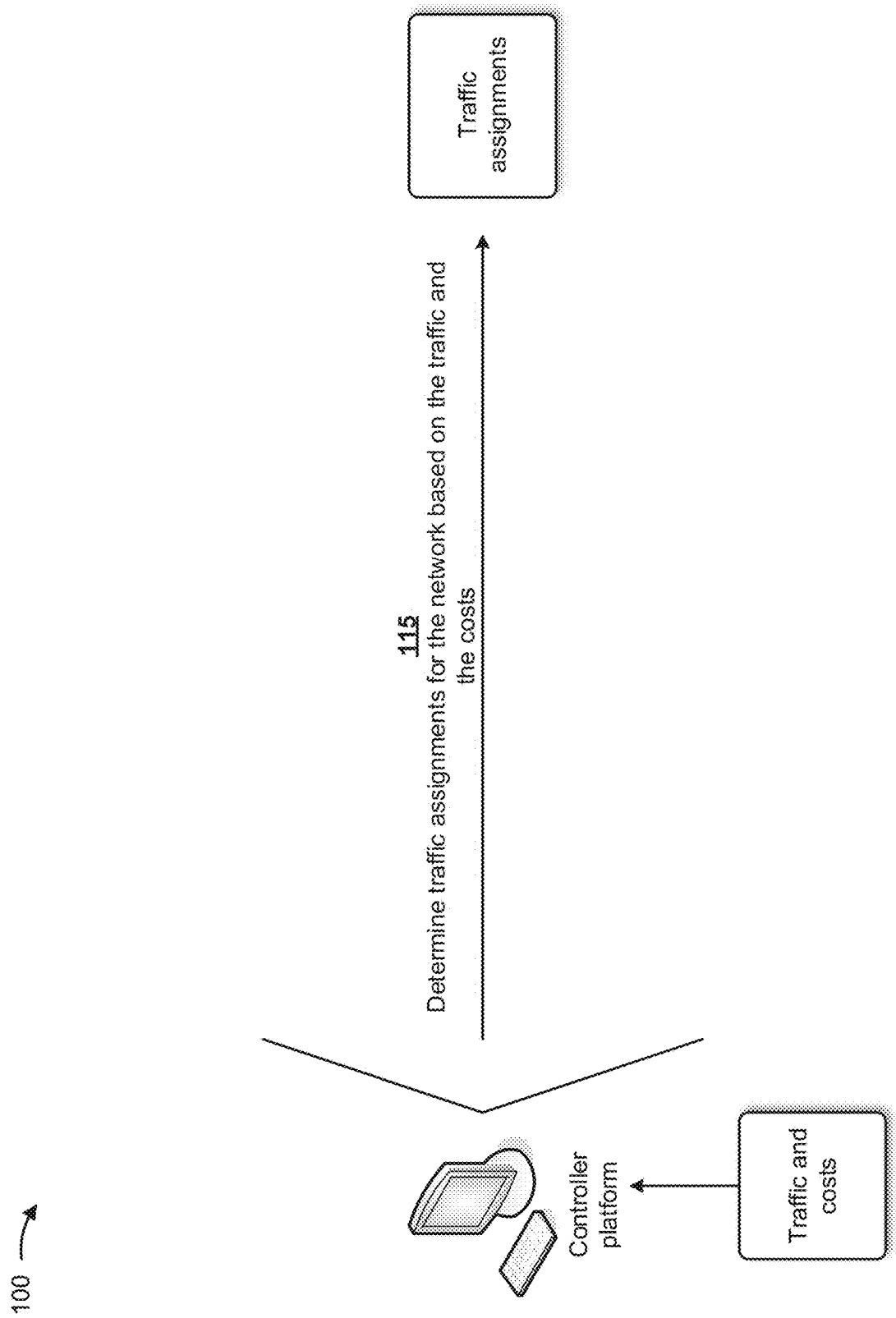

As shown in FIG. 1C, and by reference number 115, the controller platform may determine traffic assignments for the network based on the traffic and the costs. A traffic plan for a network (e.g., an egress peer engineering network, such as AS1), associated with traffic and costs, may include a set of traffic assignments. Each traffic assignment may assign some or all of the traffic to one or more tunnels. Such a traffic assignment may imply a tunnel use relationship between the traffic plan and the tunnels and may imply a peer link use relationship between the traffic plan and peer links. A traffic plan may include a total cost which is a sum of internal and external transit costs, peering costs, and costs of unassigned traffic (e.g., not engineered).

The traffic plan may include a partition of the traffic into an unassigned set and an assigned set that participated in a traffic assignment relationship that mapped the assigned set of traffic to a tunnel. The traffic assignment relationship may cause tunnel use and peer link use relationships that track a use of the tunnels and the peer links, respectively, in the traffic plan. In some implementations, a traffic assignment may assign traffic for a prefix at a PE network device to a tunnel. The controller platform may calculate internal and external costs of the traffic assignment by multiplying a rate associated with the traffic by a cost rate of the tunnel and by an external rate of the peer link, respectively.

Figure 1D:
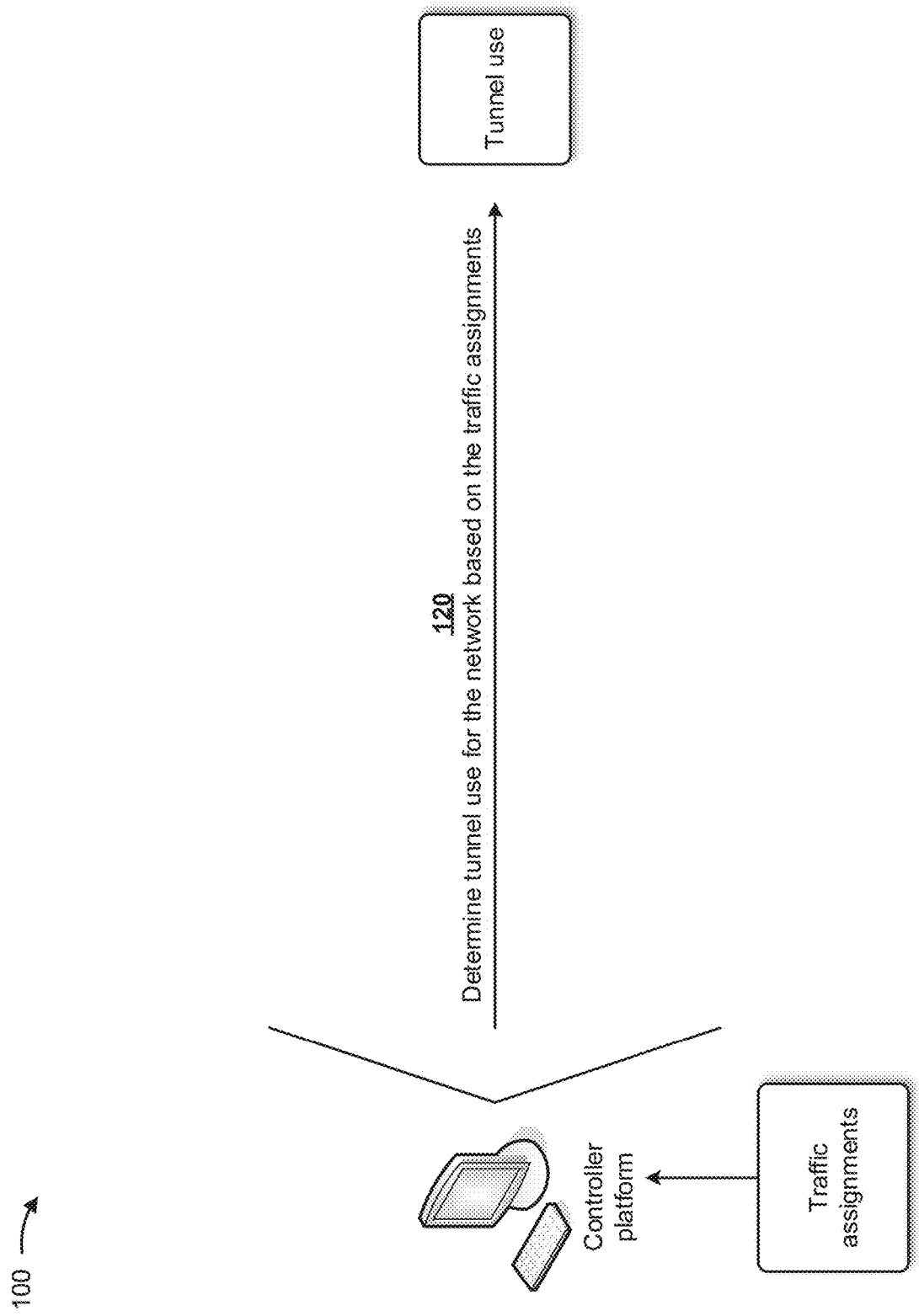

As shown in FIG. 1D, and by reference number 120, the controller platform may determine tunnel use for the network based on the traffic assignments. In some implementations, if a traffic plan uses a tunnel for one or more of the traffic assignments, the controller platform may determine that there is a tunnel use relationship between the traffic plan and the tunnel. The controller platform may determine a bandwidth used by the tunnel in the traffic plan by adding the bandwidths of the traffic assigned to the tunnel. The controller platform may calculate a cost of the tunnel use by multiplying a cost per bandwidth for the tunnel by a value-biased bandwidth of the tunnel use. In some implementations, the tunnel use may indicate a quantity of tunnels to be utilized for the network.

Figure 1E:
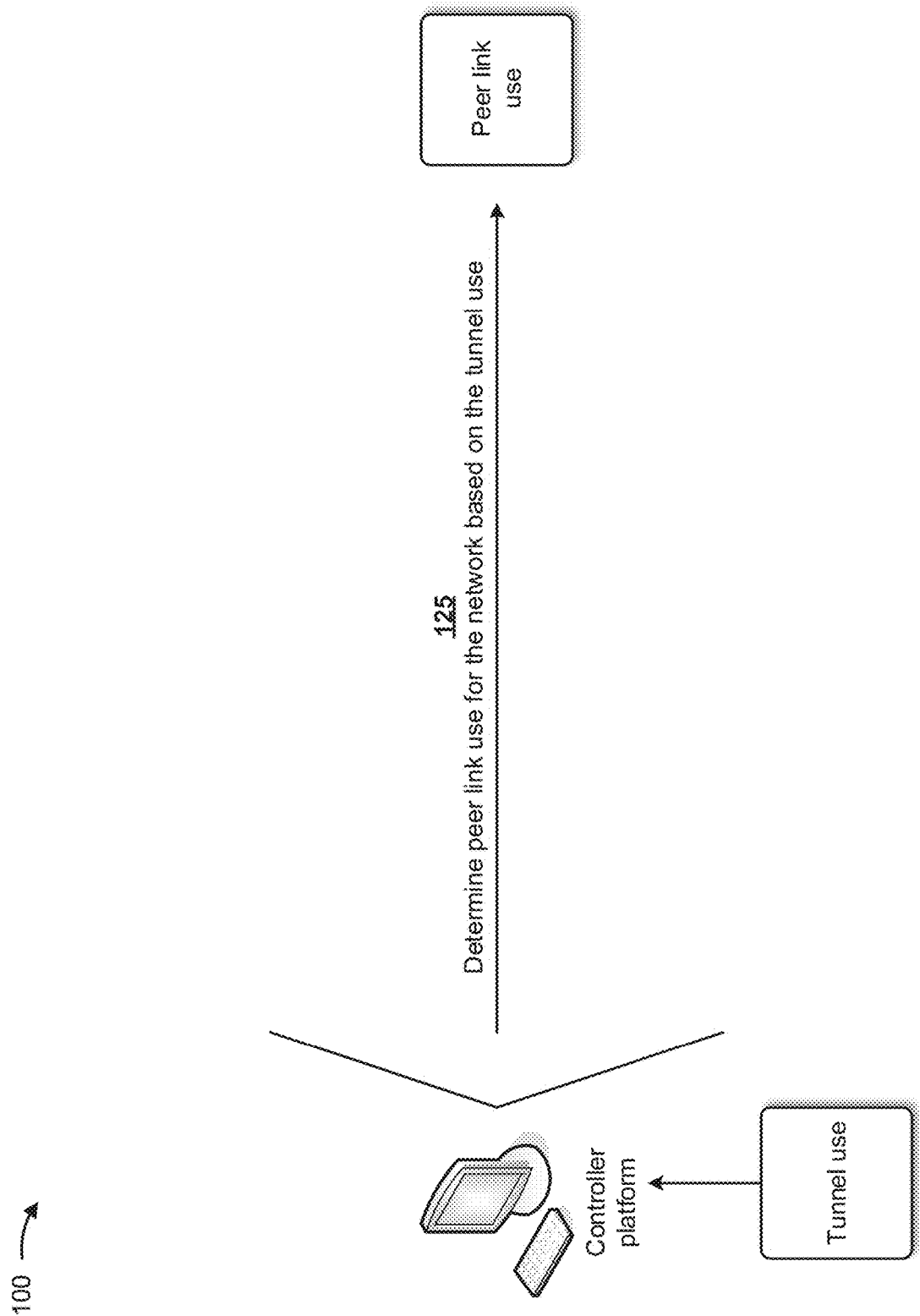

As shown in FIG. 1E, and by reference number 125, the controller platform may determine peer link use for the traffic plans based on the tunnel use. In some implementations, the peer link use may indicate a quantity of peer links to be utilized for the network. In some implementations, a peer link use may indicate a bandwidth usage and a cost of a peer link in the traffic plan. A peer link may be used in a traffic plan each time traffic is assigned to a tunnel that ends on a peer link. The controller platform may include only peer links that are actually used in the traffic plan when generating the peer link use. The peer link use may include bandwidth used by the peer link and a cost associated with the bandwidth use. The controller platform may determine the bandwidth used by adding all of the bandwidth for traffic assigned to tunnels ending on a peer link. The controller platform may calculate the cost associated with the bandwidth use by applying a peering rate plan of a peer link to a value-biased bandwidth of the peer link use. In some implementations, the controller platform may propose plans that include introducing new tunnels and peer links.

In some implementations, the controller platform may calculate a peer cost for a traffic plan by adding the costs of the peer link uses of the traffic plan. In one example, the controller platform may analyze internal and external costs of a traffic plan, from a traffic assignment perspective, by calculating the internal cost as a sum of the traffic assignment internal costs and by calculating the external cost as a sum of the traffic assignment external costs. In another example, the controller platform may analyze internal and external costs of a traffic plan, from a tunnel use perspective, by calculating the internal cost as a sum of the tunnel use costs and by calculating the external cost as a sum over all tunnel uses (e.g., for traffic assigned to the tunnel in the traffic plan, the external cost may be determined by multiplying a value-biased bandwidth of the traffic by an external rate of a prefix of the traffic for the peer link of the tunnel).

In some implementations, the controller platform (e.g., for a traffic plan) may not assign all traffic to tunnels. Any traffic that is not assigned to a tunnel may be tracked by the controller platform in an unassigned set. The controller platform may determine a cost of the unassigned traffic by multiplying a value-biased bandwidth for the unassigned traffic by an unassigned traffic factor for the network. In such implementations, it may be possible that a total cost of a traffic plan with unassigned traffic is less than traffic plans which assign all traffic.

Figure 1F:
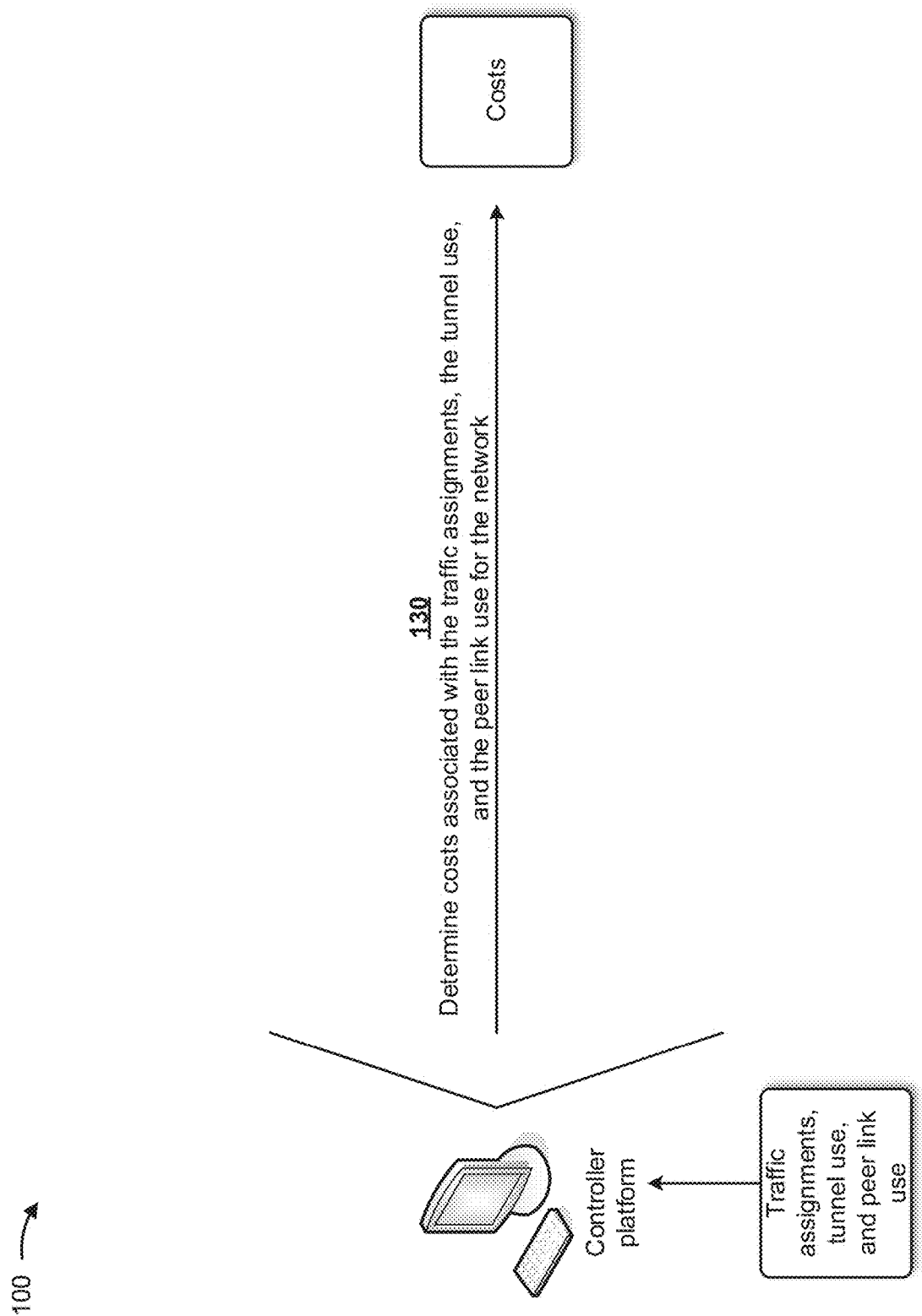

As shown in FIG. 1F, and by reference number 130, the controller platform may determine costs associated with the traffic assignments, the tunnel use, and the peer link use for the network. In some implementations, the controller platform may determine a cost of a potential traffic plan by adding costs associated with the tunnel use and the peer link use (e.g., as generated based on the traffic assignments) by the potential traffic plan. The controller platform may also add any unassigned traffic costs to the determined cost of the potential traffic plan to determine a total cost of the potential traffic plan.

As shown in FIG. 1G, and by reference number 135, the controller platform may generate traffic plans based on the traffic assignments, the tunnel use, the peer link use, and the costs associated with the traffic assignments, the tunnel use, and the peer link use. For example, after determining the costs associated with the traffic assignments, the tunnel use, and the peer link use, the controller platform may utilize the traffic assignments, the tunnel use, the peer link use, and the costs associated with the traffic assignments, the tunnel use, and the peer link use for the network to generate information identifying the traffic assignments, the tunnel use, the peer link use, and the costs for each of the traffic plans. In some implementations, the controller platform may provide such information to a client device (e.g., via a user interface) so that a user of the client device may review the different traffic plans and/or select one of the traffic plans. In some implementations, if costs associated with one or more particular traffic plans satisfy (e.g., exceed) a threshold cost for the traffic plans, the controller platform may remove the one or more particular traffic plans from the traffic plans, to create a subset of the traffic plans.

Figure 1H:
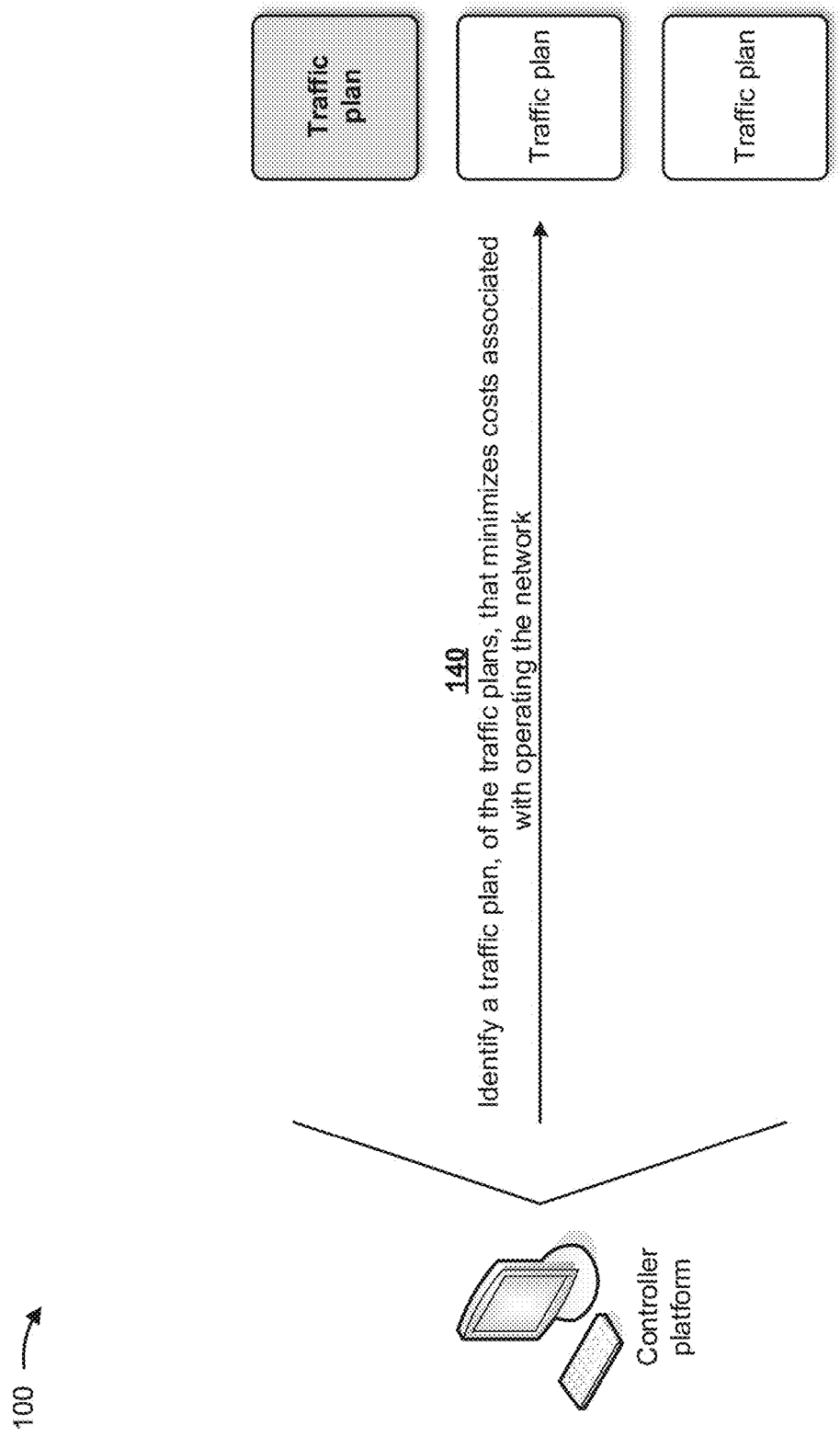

As shown in FIG. 1H, and by reference number 140, the controller platform may identify a traffic plan, of the traffic plans, that minimizes costs associated with operating the network (e.g., reduces resource usage by the network). In some implementations, the controller platform may compare the costs determined for each of the traffic plans, and may select a traffic plan with a lowest cost. In some implementations, the controller platform may select a traffic plan with a lowest quantity of unassigned traffic, even if the traffic plan does not include the lowest cost. The controller platform may select a traffic plan with a lowest quantity of unassigned traffic and a lowest cost. In some implementations, the controller platform may provide information identifying the traffic plans to a client device, and may receive a selection of a traffic plan from the client device. The controller platform may utilize the traffic plan identified by the selection.

Figure 1I:
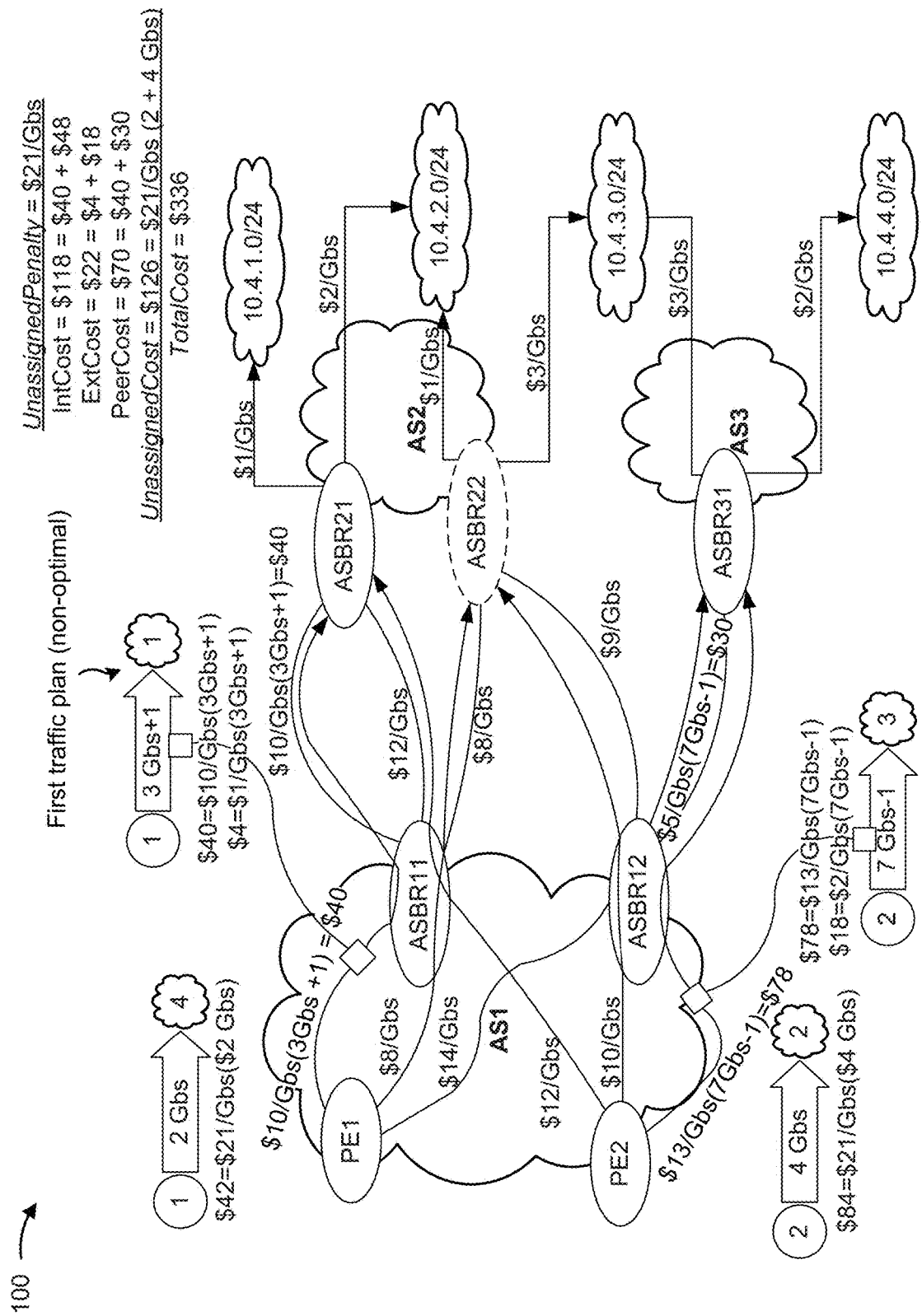

For example, as shown in FIG. 1I, the controller platform may generate a first traffic plan that is non-optimal. The first traffic plan may assign traffic from PE1 to the first prefix (e.g., 10.4.1.0/24) and from PE2 to the third prefix (e.g., 10.4.3.0/24) to appropriate tunnels, but may not assign a remaining portion of the traffic (e.g., the traffic from PE1 to the fourth prefix and the traffic from PE2 to the second prefix). The first traffic plan may not assign internal and external transit costs and may apply unassigned traffic penalties (e.g., $126) to the cost of the plan (e.g., $210) to arrive at a total cost (e.g., $336). The used tunnels and peer links may be annotated with internal transit and peering costs, respectively.

Figure 1J:
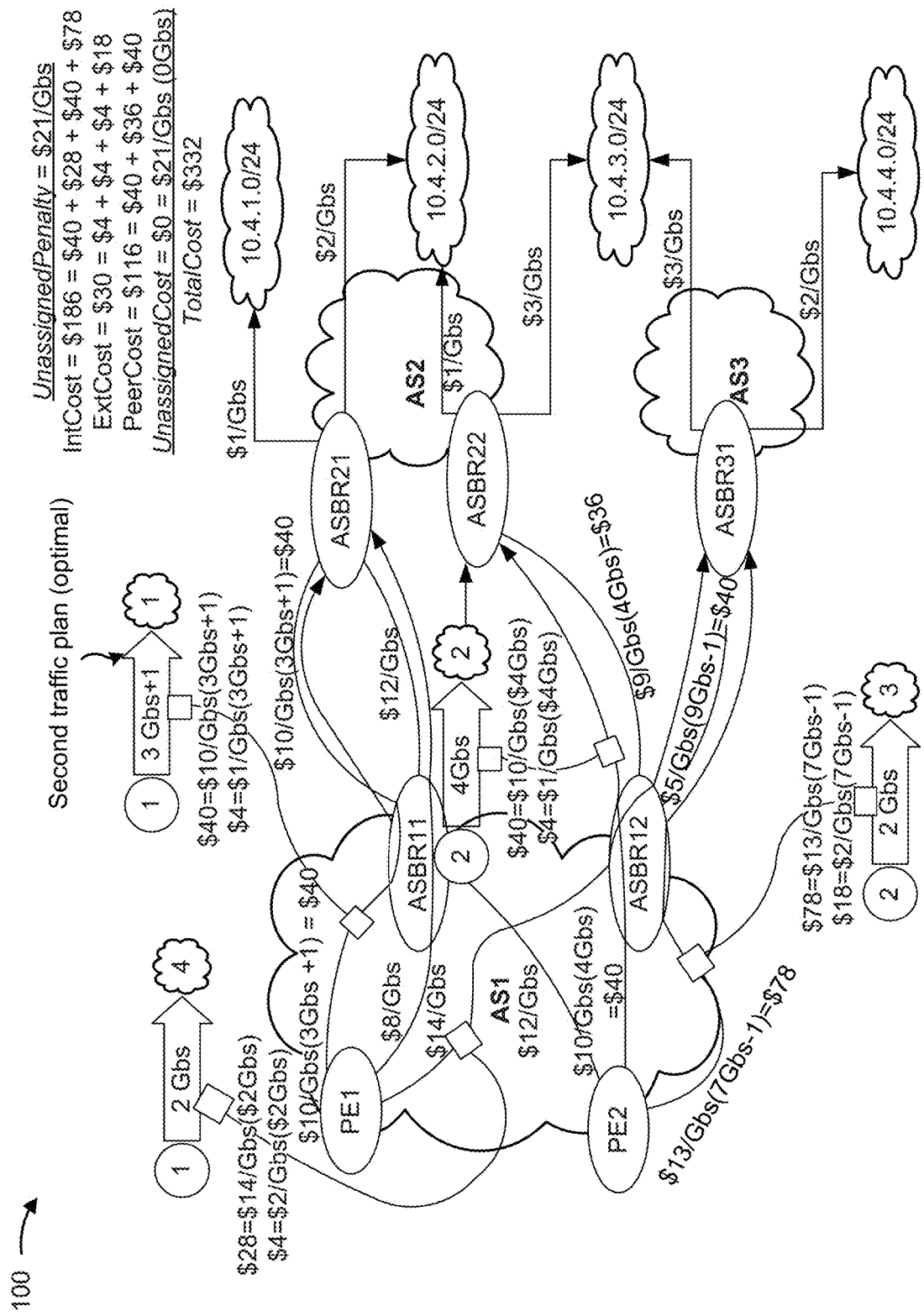

As shown in FIG. 1J, the controller platform may generate a second traffic plan that is optimal. The second traffic plan may assign traffic from PE1 to the first prefix (e.g., 10.4.1.0/24), from PE1 to the fourth prefix (e.g., 10.4.4.0/24), from PE2 to the second prefix (e.g., 10.4.2.0/24), and from PE2 to the third prefix (e.g., 10.4.3.0/24) to appropriate tunnels. The second traffic plan may include a total cost (e.g., $332) that is less than the total cost (e.g., $336) of the first traffic plan. In such examples, the controller platform may identify the second traffic plan as the traffic plan to implement in the network. In some implementations, the total cost of the second traffic plan may be further reduced by not assigning the traffic from PE1 to the fourth prefix since the unassigned traffic penalty associated with this traffic is less than a cost associated with assigning this traffic.

Figure 1K:
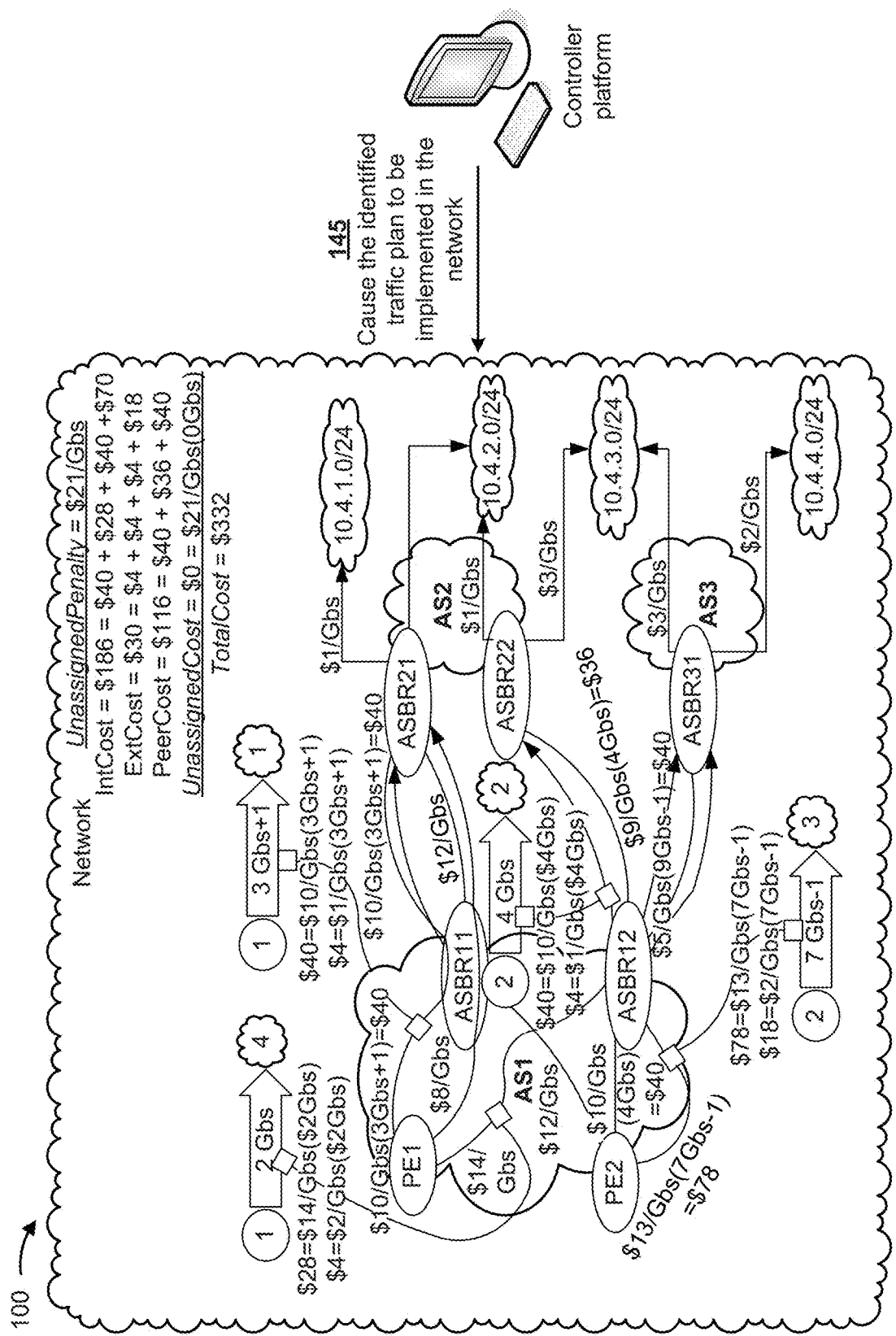

As shown in FIG. 1K, and by reference number 145, the controller platform may cause the identified traffic plan to be implemented in the network. For example, the controller platform may assign traffic (e.g., based on the traffic assignments) to tunnels, based on the identified traffic plan, and the network devices and the links of the network may implement the traffic assignments and tunnels. In some implementations, the controller platform may cause the identified traffic plan to be implemented in the network by providing, to one or more of the network devices, instructions indicating that the one or more network devices, and the links associated with the one or more network devices, are to implement the identified traffic plan. The one or more network devices may receive the instructions and may implement the identified traffic plan based on the instructions. For example, the controller device may provide, to three network devices, instructions indicating that the three network devices (e.g., and two links provided between the three network devices) are to assign particular traffic to a particular tunnel. The three network devices may receive the instructions and may assign the particular traffic to the particular tunnel based on the instructions.

In some implementations, the controller platform may receive additional network data from the network based on causing the identified traffic plan to be implemented in the network, and may modify the identified traffic plan based on the additional network data to generate a modified traffic plan. For example, if the additional network data indicates that a portion of the network is failing to manage a new traffic demand, the controller platform may modify the identified traffic plan to manage the new traffic demand. The controller platform may then cause the modified traffic plan to be implemented in the network, as described above.

In some implementations, the controller platform may be utilized to determine traffic plans for existing networks, for networks to be created, and/or the like. For example, the controller platform may discover traffic (e.g., top prefixes utilized, traffic demands grouped by PE-prefix combinations, and/or the like) in an existing network (e.g., via the network data), may identify a current traffic plan for the network (e.g., tunnels used for egress peer engineering; network devices and links involved as PEs, ASBRs, and peer links; prefixes from traffic demands provided to the tunnels; and/or the like), and may calculate costs for changing the traffic plan (e.g., update internal and external transit costs based on traffic quality of service monitoring, update peering plans based on partnership changes, and/or the like).

In another example, the controller platform may propose new traffic plans for a current traffic plan of a network (e.g., traffic plans with lower costs than a cost of the current plan, traffic plans with limited unassigned traffic, traffic plans with limited changes to the network, and/or the like), and may apply a best new traffic plan to the network (e.g., update traffic demand-tunnel mapping, resize tunnels if necessary, and/or the like).

In this way, the controller platform may utilize egress peer engineering to determine and implement an optimized traffic plan. This, in turn, conserves computing resources (e.g., processing resources, memory resources, and/or the like), networking resources, and/or the like that would otherwise be wasted in identifying a sub-optimal traffic plan, correcting inefficient network operation caused by the sub-optimal traffic plan, correcting inefficient utilization of network resources caused by the sub-optimal traffic plan, and/or the like. Furthermore, implementations described herein use a rigorous, computerized process to perform tasks that were not previously performed. For example, currently there does not exist a technique that utilizes egress peer engineering to determine optimized traffic plans and to implement an optimized traffic plan.

As indicated above, FIGS. 1A-1K are provided merely as examples. Other examples may differ from what is described with regard to FIGS. 1A-1K.

Figure 2:
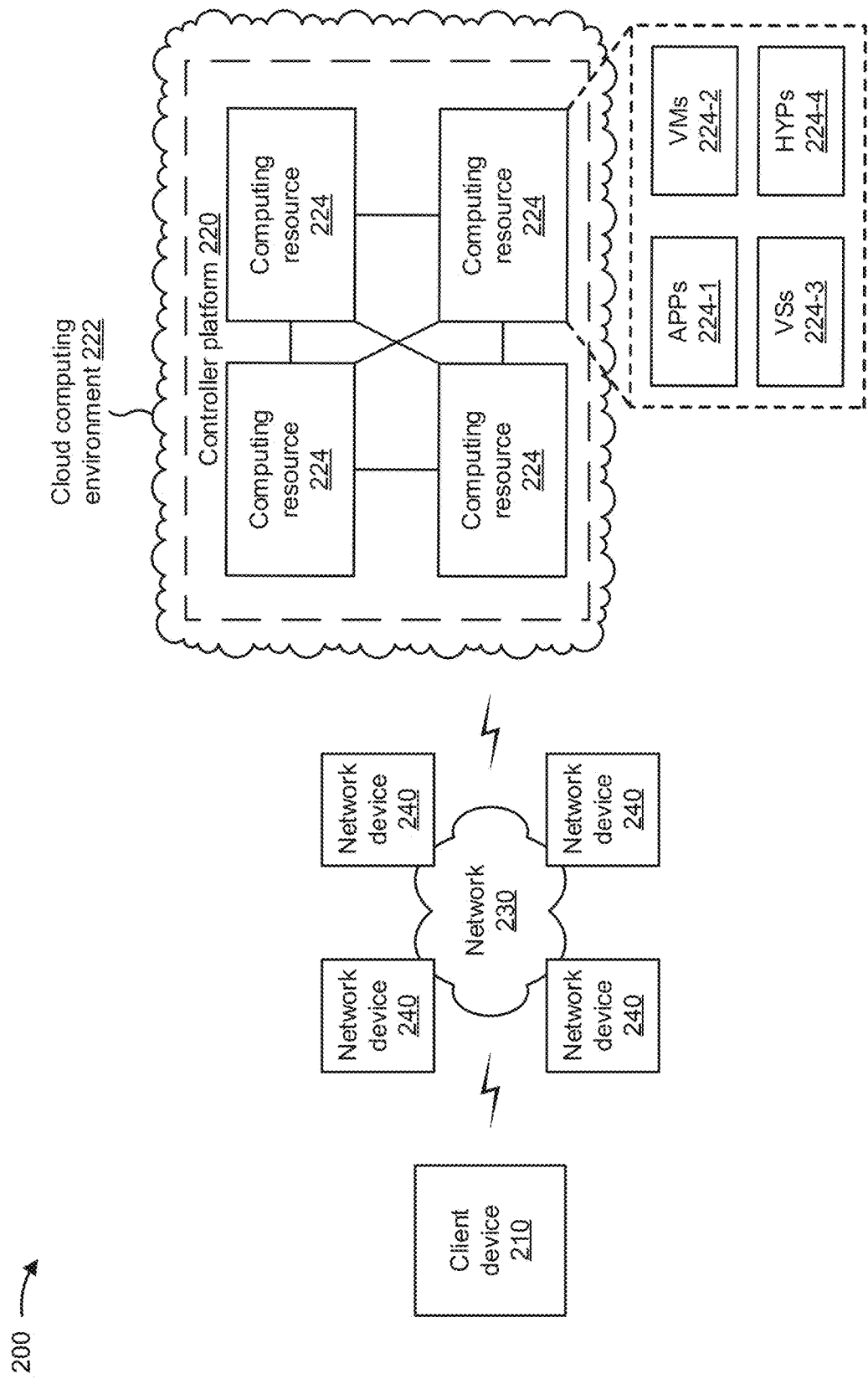
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a controller platform 220, a network 230, and a group of network devices 240 of network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, client device 210 may receive information from and/or transmit information to controller platform 220, via network 230 and network devices 240. In some implementations, client device 210 may receive network traffic from and/or may provide network traffic to other client devices 210 via network 230 (e.g., by routing packets using network devices 240 as intermediaries).

Controller platform 220 includes one or more devices that utilize egress peer engineering to determine optimized traffic plans and to implement an optimized traffic plan. In some implementations, controller platform 220 may be designed to be modular such that certain software components may be swapped in or out depending on a particular need. As such, controller platform 220 may be easily and/or quickly reconfigured for different uses. In some implementations, controller platform 220 may receive information from and/or transmit information to one or more client devices 210 and/or network devices 240.

In some implementations, as shown, controller platform 220 may be hosted in a cloud computing environment 222. Notably, while implementations described herein describe controller platform 220 as being hosted in cloud computing environment 222, in some implementations, controller platform 220 may not be cloud-based (i.e., may be implemented outside of a cloud computing environment) or may be partially cloud-based.

Cloud computing environment 222 includes an environment that hosts controller platform 220. Cloud computing environment 222 may provide computation, software, data access, storage, etc., services that do not require end-user knowledge of a physical location and configuration of system(s) and/or device(s) that hosts controller platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host controller platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210 and/or network devices 240. For example, application 224-1 may include software associated with controller platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of controller platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Network device 240 includes one or more devices capable of receiving, processing, storing, routing, and/or providing traffic (e.g., a packet, other information or metadata, and/or the like) in a manner described herein. For example, network device 240 may include a router, such as a label switching router (LSR), a label edge router (LER), an ingress router, an egress router, a provider router (e.g., a provider edge router, a provider core router, etc.), a virtual router, and/or the like. Additionally, or alternatively, network device 240 may include a gateway, a switch, a firewall, a hub, a bridge, a reverse proxy, a server (e.g., a proxy server, a cloud server, a data center server, etc.), a load balancer, and/or a similar device. In some implementations, network device 240 may be a physical device implemented within a housing, such as a chassis. In some implementations, network device 240 may be a virtual device implemented by one or more computer devices of a cloud computing environment or a data center. In some implementations, a group of network devices 240 may be a group of data center nodes that are used to route traffic flow through network 230.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
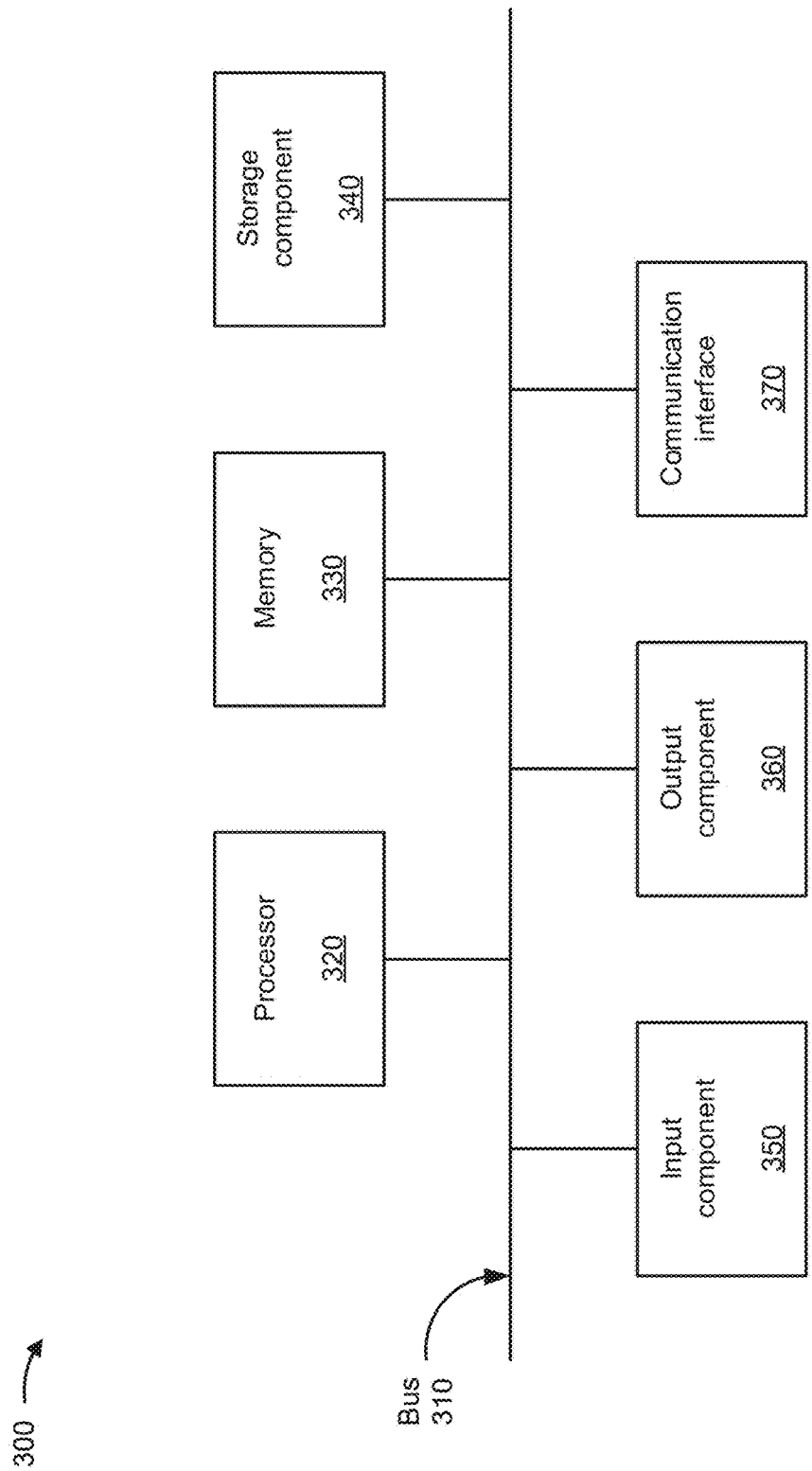
FIG. 3 is a diagram of example components of one or more devices of FIG. 2.

FIG. 3 is a diagram of example components of a device 300. Device 300 may correspond to client device 210, controller platform 220, computing resource 224, and/or network device 240. In some implementations, client device 210, controller platform 220, computing resource 224, and/or network device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
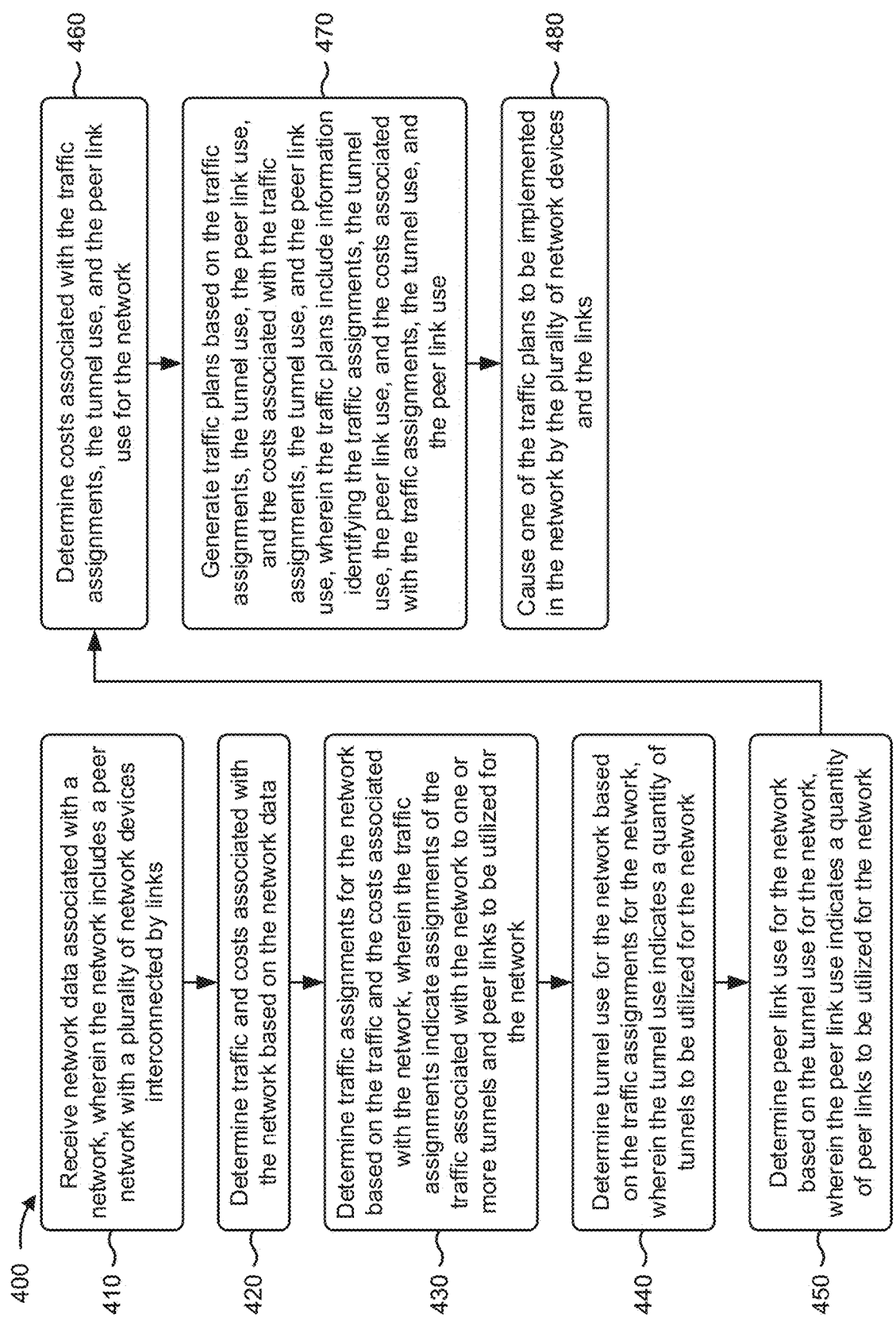

FIG. 4 is a flow chart of an example process 400 for utilizing egress peer engineering to determine optimized traffic plans and to implement an optimized traffic plan. In some implementations, one or more process blocks of FIG. 4 may be performed by a controller platform (e.g., controller platform 220). In some implementations, one or more process blocks of FIG. 4 may be performed by another device or a group of devices separate from or including the controller platform, such as a client device (e.g., client device 210) and/or a network device (e.g., network device 240).

As shown in FIG. 4, process 400 may include receiving network data associated with a network, wherein the network includes a peer network with a plurality of network devices interconnected by links (block 410). For example, the controller platform (e.g., using computing resource 224, processor 320, communication interface 370, and/or the like) may receive network data associated with a network, as described above in connection with FIGS. 1A-3. In some aspects, the network may include a peer network with a plurality of network devices interconnected by links.

As further shown in FIG. 4, process 400 may include determining traffic and costs associated with the network based on the network data (block 420). For example, the controller platform (e.g., using computing resource 224, processor 320, memory 330, and/or the like) may determine traffic and costs associated with the network based on the network data, as described above in connection with FIGS. 1A-3.

As further shown in FIG. 4, process 400 may include determining traffic assignments for the network based on the traffic and the costs associated with the network, wherein the traffic assignments indicate assignments of the traffic associated with the network to one or more tunnels and peer links to be utilized for the network (block 430). For example, the controller platform (e.g., using computing resource 224, processor 320, storage component 340, communication interface 370 and/or the like) may determine traffic assignments for the network based on the traffic and the costs associated with the network, as described above in connection with FIGS. 1A-3. In some aspects, the traffic assignments may indicate assignments of the traffic associated with the network to one or more tunnels and peer links to be utilized for the network.

As further shown in FIG. 4, process 400 may include determining tunnel use for the network based on the traffic assignments for the network, wherein the tunnel use indicates a quantity of tunnels to be utilized for the network (block 440). For example, the controller platform (e.g., using computing resource 224, processor 320, memory 330, communication interface 370 and/or the like) may determine tunnel use for the network based on the traffic assignments for the network, as described above in connection with FIGS. 1A-3. In some aspects, the tunnel use may indicate a quantity of tunnels to be utilized for the network.

As further shown in FIG. 4, process 400 may include determining peer link use for the network based on the tunnel use for the network, wherein the peer link use indicates a quantity of peer links to be utilized for the network (block 450). For example, the controller platform (e.g., using computing resource 224, processor 320, storage component 340, and/or the like) may determine peer link use for the network based on the tunnel use for the network, as described above in connection with FIGS. 1A-3. In some aspects, the peer link use may indicate a quantity of peer links to be utilized for the network.

As further shown in FIG. 4, process 400 may include determining costs associated with the traffic assignments, the tunnel use, and the peer link use for the network (block 460). For example, the controller platform (e.g., using computing resource 224, processor 320, memory 330, and/or the like) may determine, by the device, costs associated with the traffic assignments, the tunnel use, and the peer link use for the network, as described above in connection with FIGS. 1A-3.

As further shown in FIG. 4, process 400 may include generating traffic plans based on the traffic assignments, the tunnel use, the peer link use, and the costs associated with the traffic assignments, the tunnel use, and the peer link use, wherein the traffic plans include information identifying the traffic assignments, the tunnel use, the peer link use, and the costs associated with the traffic assignments, the tunnel use, and the peer link use (block 470). For example, the controller platform (e.g., using computing resource 224, processor 320, storage component 340, and/or the like) may generate traffic plans based on the traffic assignments, the tunnel use, the peer link use, and the costs associated with the traffic assignments, the tunnel use, and the peer link use, as described above in connection with FIGS. 1A-3. In some aspects, the traffic plans may include information identifying the traffic assignments, the tunnel use, the peer link use, and the costs associated with the traffic assignments, the tunnel use, and the peer link use.

As further shown in FIG. 4, process 400 may include causing one of the traffic plans to be implemented in the network by the plurality of network devices and the links (block 480). For example, the controller platform (e.g., using computing resource 224, processor 320, memory 330, storage component 340, communication interface 370, and/or the like) may cause, by the device, one of the traffic plans to be implemented in the network by the plurality of network devices and the links, as described above in connection with FIGS. 1A-3.

Process 400 may include additional implementations, such as any single implementation or any combination of implementations described below and/or in connection with one or more other processes described elsewhere herein.

In some implementations, the plurality of network devices may include at least one provider edge (PE) network device, at least one egress autonomous system border router (ASBR), and at least one peer ASBR. In some implementations, the controller platform may identify a traffic plan, of the traffic plans, that minimizes costs associated with operating the network, wherein the one of the traffic plans includes the traffic plan. In some implementations, when causing the one of the traffic plans to be implemented in the network, the controller platform may provide, to the plurality of network devices, instructions indicating the traffic assignments, the tunnel use, and the peer link use, associated with the one of the traffic plans, to be implemented by the plurality of network devices.

In some implementations, the controller platform may receive additional network data from the network based on causing the one of the traffic plans to be implemented in the network, may modify the one of the traffic plans based on the additional network data to generate a modified traffic plan, and may cause the modified traffic plan to be implemented in the network by the plurality of network devices and the links.

In some implementations, the costs for the traffic plans may include internal transit costs of the traffic associated with the network, peering costs associated with the peer link use, external transit costs of the traffic associated with the network, costs associated with the traffic that is unassigned, and/or the like.

In some implementations, the controller platform may provide, to a client device, the information identifying the traffic assignments, the tunnel use, the peer link use, and the costs associated with the traffic assignments, the tunnel use, and the peer link use; may receive, from the client device, a selection of the one of the traffic plans based on the information provided to the client device; and may cause the one of the traffic plans to be implemented in the network based on the selection.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
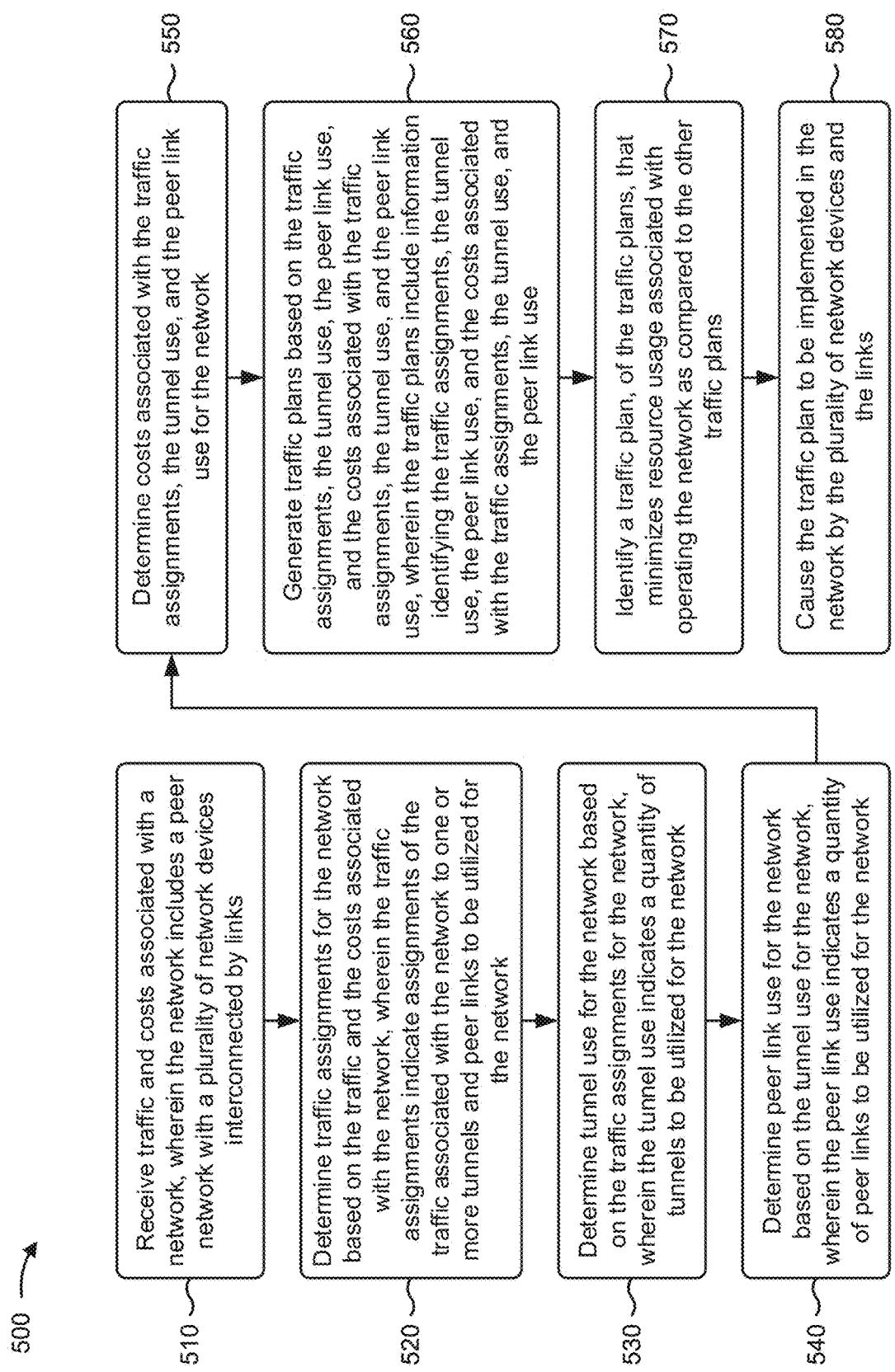

FIG. 5 is a flow chart of an example process 500 for utilizing egress peer engineering to determine optimized traffic plans and to implement an optimized traffic plan. In some implementations, one or more process blocks of FIG. 5 may be performed by a controller platform (e.g., controller platform 220). In some implementations, one or more process blocks of FIG. 5 may be performed by another device or a group of devices separate from or including the controller platform, such as a client device (e.g., client device 210) and/or a network device (e.g., network device 240).

As shown in FIG. 5, process 500 may include receiving traffic and costs associated with a network, wherein the network includes a peer network with a plurality of network devices interconnected by links (block 510). For example, the controller platform (e.g., using computing resource 224, communication interface 370, and/or the like) may receive traffic and costs associated with a network, as described above in connection with FIGS. 1A-3. In some aspects, the network may include a peer network with a plurality of network devices interconnected by links.

As further shown in FIG. 5, process 500 may include determining traffic assignments for the network based on the traffic and the costs associated with the network, wherein the traffic assignments indicate assignments of the traffic associated with the network to one or more tunnels and peer links to be utilized for the network (block 520). For example, the controller platform (e.g., using computing resource 224, processor 320, memory 330, and/or the like) may determine traffic assignments for the network based on the traffic and the costs associated with the network, as described above in connection with FIGS. 1A-3. In some aspects, the traffic assignments may indicate assignments of the traffic associated with the network to one or more tunnels and peer links to be utilized for the network.

As further shown in FIG. 5, process 500 may include determining tunnel use for the network based on the traffic assignments for the network, wherein the tunnel use indicates a quantity of tunnels to be utilized for the network (block 530). For example, the controller platform (e.g., using computing resource 224, processor 320, storage component 340, and/or the like) may determine tunnel use for the network based on the traffic assignments for the network, as described above in connection with FIGS. 1A-3. In some aspects, the tunnel use may indicate a quantity of tunnels to be utilized for the network.

As further shown in FIG. 5, process 500 may include determining peer link use for the network based on the tunnel use for the network wherein the peer link use indicates a quantity of peer links to be utilized for the network (block 540). For example, the controller platform (e.g., using computing resource 224, processor 320, memory 330, and/or the like) may determine peer link use for the network based on the tunnel use for the network, as described above in connection with FIGS. 1A-3. In some aspects, the peer link use may indicate a quantity of peer links to be utilized for the network.

As further shown in FIG. 5, process 500 may include determining costs associated with the traffic assignments, the tunnel use, and the peer link use for the network (block 550). For example, the controller platform (e.g., using computing resource 224, processor 320, storage component 340, and/or the like) may determine costs associated with the traffic assignments, the tunnel use, and the peer link use for the network, as described above in connection with FIGS. 1A-3.

As further shown in FIG. 5, process 500 may include generating traffic plans based on the traffic assignments, the tunnel use, the peer link use, and the costs associated with the traffic assignments, the tunnel use, and the peer link use, wherein the traffic plans include information identifying the traffic assignments, the tunnel use, the peer link use, and the costs associated with the traffic assignments, the tunnel use, and the peer link use (block 560). For example, the controller platform (e.g., using computing resource 224, processor 320, memory 330, and/or the like) may generate traffic plans based on the traffic assignments, the tunnel use, the peer link use, and the costs associated with the traffic assignments, the tunnel use, and the peer link use, as described above in connection with FIGS. 1A-3. In some aspects, the traffic plans may include information identifying the traffic assignments, the tunnel use, the peer link use, and the costs associated with the traffic assignments, the tunnel use, and the peer link use.

As further shown in FIG. 5, process 500 may include identifying a traffic plan, of the traffic plans, that minimizes resource usage associated with operating the network as compared to the other traffic plans (block 570). For example, the controller platform (e.g., using computing resource 224, processor 320, storage component 340, and/or the like) may identify a traffic plan, of the traffic plans, that minimizes resource usage associated with operating the network as compared to the other traffic plans, as described above in connection with FIGS. 1A-3.

As further shown in FIG. 5, process 500 may include causing the traffic plan to be implemented in the network by the plurality of network devices and the links (block 580). For example, the controller platform (e.g., using computing resource 224, processor 320, memory 330, storage component 340, and/or the like) may cause the traffic plan to be implemented in the network by the plurality of network devices and the links, as described above in connection with FIGS. 1A-3.

Process 500 may include additional implementations, such as any single implementation or any combination of implementations described below and/or in connection with one or more other processes described elsewhere herein.

In some implementations, the controller platform may determine that a cost associated with a particular traffic plan, of the traffic plans, exceeds a threshold cost for the traffic plans; may remove the particular traffic plan from the traffic plans, based on the particular traffic plan exceeding the threshold cost, to create a subset of the traffic plans; and may identify the traffic plan from the subset of the traffic plans.

In some implementations, the traffic plans may include updates to an existing traffic plan implemented in the network, new traffic plans to replace the existing traffic plan implemented in the network, and/or the like. In some implementations, the plurality of network devices may include at least one provider edge (PE) network device, at least one egress autonomous system border router (ASBR), at least one peer ASBR, and/or the like. In some implementations, the links may include at least one peer link connecting an egress network device, of the plurality of network devices, to a peer network device of the plurality of network devices.

In some implementations, the costs associated with the network are based on a set of traffic rate ranges with lower and upper bounds ($b_0=0, b_1, \ldots, b_n=B$ in gigabits per second (Gb/s)) and on a cost rate ($c_1, \ldots, c_n$ dollars per Gb/s) for traffic in the set of traffic rate ranges. In some implementations, the costs associated with the network (e.g., for network bandwidth, (I) are determined as follows:

$$\text{cost}(U) = \sum_{0 < i \leq n} \begin{cases} 0 & \text{if } U = b_0 = 0 \\ c_i(U - b_{i-1}) & \text{if } b_{i-1} < U \leq b_i \\ c_i(b_i - b_{i-1}) & \text{if } b_i < U \end{cases}.$$

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing egress peer engineering to determine optimized traffic plans and to implement an optimized traffic plan. In some implementations, one or more process blocks of FIG. 6 may be performed by a controller platform (e.g., controller platform 220). In some implementations, one or more process blocks of FIG. 6 may be performed by another device or a group of devices separate from or including the controller platform, such as a client device (e.g., client device 210) and/or a network device (e.g., network device 240).

As shown in FIG. 6, process 600 may include receiving network data associated with a network, wherein the network includes a peer network with a plurality of network devices interconnected by links and wherein the network data includes data identifying traffic and costs associated with the network (block 610). For example, the controller platform (e.g., using computing resource 224, processor 320, communication interface 370, and/or the like) may receive network data associated with a network, as described above in connection with FIGS. 1A-3. In some aspects, the network may include a peer network with a plurality of network devices interconnected by links, and the network data may include data identifying traffic and costs associated with the network.

As further shown in FIG. 6, process 600 may include determining traffic assignments for the network based on the traffic and the costs associated with the network, wherein the traffic assignments indicate assignments of the traffic associated with the network to one or more tunnels and peer links to be utilized for the network (block 620). For example, the controller platform (e.g., using computing resource 224, processor 320, memory 330, and/or the like) may determine traffic assignments for the network based on the traffic and the costs associated with the network, as described above in connection with FIGS. 1A-3. In some aspects, the traffic assignments may indicate assignments of the traffic associated with the network to one or more tunnels and peer links to be utilized for the network.

As further shown in FIG. 6, process 600 may include determining tunnel use for the network based on the traffic assignments for the network, wherein the tunnel use indicates a quantity of tunnels to be utilized for the network (block 630). For example, the controller platform (e.g., using computing resource 224, processor 320, storage component 340, and/or the like) may determine tunnel use for the network based on the traffic assignments for the network, as described above in connection with FIGS. 1A-3. In some aspects, the tunnel use may indicate a quantity of tunnels to be utilized for the network.

As further shown in FIG. 6, process 600 may include determining peer link use for the network based on the tunnel use for the network, wherein the peer link use indicates a quantity of peer links to be utilized for the network (block 640). For example, the controller platform (e.g., using computing resource 224, processor 320, memory 330, and/or the like) may determine peer link use for the network based on the tunnel use for the network, as described above in connection with FIGS. 1A-3. In some aspects, the peer link use may indicate a quantity of peer links to be utilized for the network.

As further shown in FIG. 6, process 600 may include determining costs associated with the traffic assignments, the tunnel use, and the peer link use for the network (block 650). For example, the controller platform (e.g., using computing resource 224, processor 320, storage component 340, and/or the like) may determine costs associated with the traffic assignments, the tunnel use, and the peer link use for the network, as described above in connection with FIGS. 1A-3.

As further shown in FIG. 6, process 600 may include generating traffic plans based on the traffic assignments, the tunnel use, the peer link use, and the costs associated with the traffic assignments, the tunnel use, and the peer link use, wherein the traffic plans include information identifying the traffic assignments, the tunnel use, the peer link use, and the costs associated with the traffic assignments, the tunnel use, and the peer link use (block 660). For example, the controller platform (e.g., using computing resource 224, processor 320, memory 330, and/or the like) may generate traffic plans based on the traffic assignments, the tunnel use, the peer link use, and the costs associated with the traffic assignments, the tunnel use, and the peer link use and, as described above in connection with FIGS. 1A-3. In some aspects, the traffic plans may include information identifying the traffic assignments, the tunnel use, the peer link use, and the costs associated with the traffic assignments, the tunnel use, and the peer link use.

As further shown in FIG. 6, process 600 may include causing one of the traffic plans to be implemented in the network by the plurality of network devices and the links, wherein the one of the traffic plans minimizes costs associated with operating the network (block 670). For example, the controller platform (e.g., using computing resource 224, processor 320, memory 330, storage component 340, communication interface 370, and/or the like) may cause one of the traffic plans to be implemented in the network by the plurality of network devices and the links, as described above in connection with FIGS. 1A-3. In some aspects, the one of the traffic plans may minimize costs associated with operating the network.

Process 600 may include additional implementations, such as any single implementation or any combination of implementations described below and/or in connection with one or more other processes described elsewhere herein.

In some implementations, the controller platform may provide, to a client device, information identifying the one of the traffic plans; may receive, from the client device, a response indicating that the one of the traffic plans is to be implemented; and may cause the one of the traffic plans to be implemented in the network based on the response. In some implementations, each of the traffic assignments may assign a portion of the traffic to one or more tunnels. In some implementations, the controller platform may identify a traffic plan, of the traffic plans, that minimizes costs associated with operating the network, where the one of the traffic plans is the traffic plan.

In some implementations, when causing the one of the traffic plans to be implemented in the network, the controller platform may provide instructions indicating the traffic assignments, the tunnel use, and the peer link use, associated with the one of the traffic plans, to cause the plurality of network devices to implement the one of the traffic plans in the network.

In some implementations, the controller platform may receive additional network data from the network based on causing the one of the traffic plans to be implemented in the network; may modify the one of the traffic plans based on the additional network data to generate a modified traffic plan; and may cause the modified traffic plan to be implemented in the network by the plurality of network devices and the links.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, network data associated with a network;
   determining, by the device, one or more traffic assignments for the network based on network traffic and costs associated with the network, wherein the network traffic and the costs associated with the network are determined based on the network data;
generating, by the device, one or more traffic plans based on the one or more traffic assignments, tunnel use for the network, peer link use for the network, and costs associated with the one or more traffic assignments, the tunnel use, and the peer link use,
wherein the tunnel use is determined based on the one or more traffic assignments,
wherein the peer link use is determined based on the tunnel use, and
wherein the one or more traffic plans include information identifying the one or more traffic assignments, the tunnel use, the peer link use, and the costs associated with the one or more traffic assignments, the tunnel use, and the peer link use; and
causing, by the device, a traffic plan of the one or more traffic plans to be implemented in the network by a plurality of network devices.

2. The method of claim 1, further comprising:
determining the costs associated with the one or more traffic assignments, the tunnel use, and the peer link use; and
identifying the traffic plan that minimizes costs associated with operating the network.

3. The method of claim 1, wherein the one or more traffic plans include information associated with partitioning the network traffic into an unassigned set and an assigned set, and
wherein the unassigned set includes information associated with unassigned network traffic that is not assigned to a tunnel; and
the method further comprises:
selecting the traffic plan with a lowest quantity of unassigned network traffic.

4. The method of claim 1, wherein the one or more traffic assignments assigns a portion of the network traffic to one or more tunnels.

5. The method of claim 1, wherein the one or more traffic assignments indicate assignments of a portion of the network traffic associated with a prefix of a provider edge network device to a tunnel.

6. The method of claim 1, wherein the plurality of network devices include at least one of:
a provider edge network device,
an egress autonomous system border router (ASBR), and
a peer ASBR.

7. The method of claim 1, wherein the tunnel use indicates a quantity of tunnels to be utilized for the network, and
wherein the peer link use indicates a quantity of peer links to be utilized for the network.

8. A device, comprising:
one or more memories; and
one or more processors, communicatively coupled to the one or more memories, to:
receive network data associated with a network;
determine one or more traffic assignments for the network based on network traffic and costs associated with the network,
wherein the network traffic and the costs associated with the network are determined based on the network data;
generate one or more traffic plans based on the one or more traffic assignments, tunnel use for the network, peer link use for the network, and costs associated with the one or more traffic assignments, the tunnel use, and the peer link use,
wherein the tunnel use is determined based on the one or more traffic assignments,
wherein the peer link use is determined based on the tunnel use, and
wherein the one or more traffic plans include information identifying the one or more traffic assignments, the tunnel use, the peer link use, and the costs associated with the one or more traffic assignments, the tunnel use, and the peer link use; and
cause a traffic plan of the one or more traffic plans to be implemented in the network by a plurality of network devices.

9. The device of claim 8, wherein the one or more processors are further to:
determine the costs associated with the one or more traffic assignments, the tunnel use, and the peer link use; and
identify the traffic plan that minimizes costs associated with operating the network.

10. The device of claim 8, wherein the one or more traffic plans include information associated with partitioning the network traffic into an unassigned set and an assigned set,
wherein the unassigned set includes information associated with unassigned network traffic that is not assigned to a tunnel, and
wherein the one or more processors are further to:
select the traffic plan with a lowest quantity of unassigned network traffic.

11. The device of claim 8, wherein the one or more traffic assignments assigns a portion of the network traffic to one or more tunnels.

12. The device of claim 8, wherein the one or more traffic assignments indicate assignments of a portion of the network traffic associated with a prefix of a provider edge network device to a tunnel.

13. The device of claim 8, wherein the plurality of network devices include at least one of:
a provider edge network device,
an egress autonomous system border router (ASBR), and
a peer ASBR.

14. The device of claim 8, wherein the tunnel use indicates a quantity of tunnels to be utilized for the network, and
wherein the peer link use indicates a quantity of peer links to be utilized for the network.

15. A non-transitory computer-readable medium storing instructions, the instructions comprising:
one or more instructions that, when executed by one or more processors, cause the one or more processors to:
receive network data associated with a network;
determine one or more traffic assignments for the network based on network traffic and costs associated with the network,
wherein the network traffic and the costs associated with the network are determined based on the network data;
generate one or more traffic plans based on the one or more traffic assignments, tunnel use for the network, peer link use for the network, and costs associated with the one or more traffic assignments, the tunnel use, and the peer link use,
wherein the tunnel use is determined based on the one or more traffic assignments,
wherein the peer link use is determined based on the tunnel use, and wherein the one or more traffic plans include information identifying the one or more traffic assignments, the tunnel use, the peer link use, and the costs associated with the one or more traffic assignments, the tunnel use, and the peer link use; and cause a traffic plan of the one or more traffic plans to be implemented in the network by a plurality of network devices.

16. The non-transitory computer-readable medium of claim 15, wherein the one or more instructions, when executed by the one or more processors, further cause the one or more processors to:

determine the costs associated with the one or more traffic assignments, the tunnel use, and the peer link use; and identify the traffic plan that minimizes costs associated with operating the network.

17. The non-transitory computer-readable medium of claim 15, wherein the one or more traffic plans include information associated with partitioning the network traffic into an unassigned set and an assigned set, wherein the unassigned set includes information associated with unassigned network traffic that is not assigned to a tunnel, and wherein the one or more instructions, when executed by the one or more processors, further cause the one or more processors to:

select the traffic plan with a lowest quantity of unassigned network traffic.

18. The non-transitory computer-readable medium of claim 15, wherein the one or more traffic assignments assigns a portion of the network traffic to one or more tunnels.

19. The non-transitory computer-readable medium of claim 15, wherein the one or more traffic assignments indicate assignments of a portion of the network traffic associated with a prefix of a provider edge network device to a tunnel.

20. The non-transitory computer-readable medium of claim 15, wherein the tunnel use indicates a quantity of tunnels to be utilized for the network, and wherein the peer link use indicates a quantity of peer links to be utilized for the network.

* * * * *